(12) United States Patent
Jin et al.

(10) Patent No.: US 11,683,720 B2
(45) Date of Patent: Jun. 20, 2023

(54) COMMUNICATION METHOD AND COMMUNICATIONS DEVICE

(71) Applicant: Huawei Technologies Co., Ltd., Shenzhen (CN)

(72) Inventors: Yinghao Jin, Boulogne Billancourt (FR); Feng Han, Shanghai (CN); Hong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 17/487,510

(22) Filed: Sep. 28, 2021

(65) Prior Publication Data

US 2022/0086688 A1 Mar. 17, 2022

Related U.S. Application Data

(63) Continuation of application No. 16/674,496, filed on Nov. 5, 2019, now Pat. No. 11,159,983, which is a (Continued)

(30) Foreign Application Priority Data

May 5, 2017 (CN) .......................... 201710313917.0

(51) Int. Cl.
*H04W 28/06* (2009.01)
*H04W 76/18* (2018.01)
(Continued)

(52) U.S. Cl.
CPC ........... *H04W 28/06* (2013.01); *H04W 48/16* (2013.01); *H04W 68/005* (2013.01);
(Continued)

(58) Field of Classification Search
CPC ... H04W 28/06; H04W 48/16; H04W 68/005; H04W 76/18; H04W 76/27; H04W 76/30
See application file for complete search history.

(56) References Cited

U.S. PATENT DOCUMENTS 9,407,391 B2 8/2016 Jain et al.
11,159,983 B2 * 10/2021 Jin ........................ H04W 48/16
(Continued)

FOREIGN PATENT DOCUMENTS

| CN | 105898894 A | 8/2016 |
|---|---|---|
| CN | 106604230 A | 4/2017 |
| RU | 2578166 C1 | 3/2016 |

OTHER PUBLICATIONS

3GPP TR 38.804 V0.4.0 (Nov. 2016), "3rd Generation Partnership Project; Technical Specification Group Radio Access Network; Study on New Radio Access Technology; Radio Interface Protocol Aspects (Release 14)", 30 pages.
(Continued)

*Primary Examiner* — Diane D Mizrahi
(74) *Attorney, Agent, or Firm* — Slater Matsil, LLP

(57) ABSTRACT

A communication method and a communications device are provided. In the method, a first base station receives a first message; the first base station determines, based on the first message, whether to allocate a new RNA to a terminal in an inactive state; and the first base station allocates a new RNA to the terminal in the inactive state after determining to allocate a new RNA to the terminal in the inactive state, so as to reduce signaling overheads; and/or the first base station receives a second message; the first base station determines a communication status of the terminal in the inactive state based on the second message; and after determining that the terminal needs to change the communication status, the first base station controls the terminal to change the communication status.

20 Claims, 16 Drawing Sheets

Related U.S. Application Data continuation of application No. PCT/CN2018/085512, filed on May 3, 2018.

(51) Int. Cl.

| | | |
|---|---|---|
| *H04W 76/30* | (2018.01) | |
| *H04W 76/11* | (2018.01) | |
| *H04W 76/27* | (2018.01) | |
| *H04W 48/16* | (2009.01) | |
| *H04W 68/00* | (2009.01) | |

(52) U.S. Cl.
CPC ............ *H04W 76/11* (2018.02); *H04W 76/18* (2018.02); *H04W 76/27* (2018.02); *H04W 76/30* (2018.02)

(56) References Cited

U.S. PATENT DOCUMENTS

| | | |
|---|---|---|
| 2014/0269534 A1 | 9/2014 | Persson et al. |
| 2016/0192370 A1 | 6/2016 | Chan et al. |
| 2019/0082490 A1 | 3/2019 | Zhang et al. |

OTHER PUBLICATIONS

3GPP TS 36.331 V14.2.2 (Apr. 2017), "3rd Generation Partnership Project;Technical Specification Group Radio Access Network;Evolved Universal Terrestrial Radio Access (E-UTRA); Radio Resource Control (RRC); Protocol specification (Release 14)", 720 pages.

3GPP TS 38.331 V0.0.2. (Mar. 2017), "3rd Generation Partnership Project;Technical Specification Group Radio Access Network; NR; Radio Resource Control (RRC); Protocol specification (Release 15)", 13 pages.

MTI, "Comparison and Discussion on RAN-based Notification Area Update", 3GPP TSG-RAN WG2 RAN#97bis, R2-1702512, Apr. 3-7, 2017, 4 pages, Spokane, USA.

Ericsson: "RAN area updating due to mobility in RRC_Inactive",3GPP Draft; R2-1702812, Apr. 3, 2017, 6 pages.

3GPP TSG-RAN WG2 #97bis, R2-1703404, NEC: "Location update at RAN-based notification area boundary", Apr. 3-7, 2017. 5 pages, Spokane, USA.

Huawei, HiSilicon, "Inter-RAT mobility for inactive UE", 3GPP TSG-RAN WG2 #97, R2-171808, Feb. 13-17, 2017, 4 pages, Athens, Greece.

Huawei et al., "Introduction of light connection in X2AP", 3GPP TSG-RAN WG3 Meeting #95 , R3-170441, Feb. 13-17, 2017, 33 pages, Athens, Greece.

CATT, "Discussion on RAN-based notification area update", 3GPP TSG-RAN WG3 #95bis, R3-170987, Apr. 3-7, 2017, 3 pages, Spokane, Washington, USA.

LG Electronics Inc.,"Discussion on inter-gNB mobility in RRC_Inactive", 3GPP TSG-RAN WG3 Meeting #95bis, R3-171130, Apr. 3-7, 2017, 4 pages, Spokane, Washington, USA.

* cited by examiner

COMMUNICATION METHOD AND COMMUNICATIONS DEVICE

CROSS-REFERENCE TO RELATED APPLICATIONS

This application is a continuation of U.S. patent application Ser. No. 16/674,496, filed on Nov. 5, 2019, which is a continuation of International Application No. PCT/CN2018/085512, filed on May 3, 2018, The International Application claims priority to Chinese Patent Application No. 201710313917.0, filed on May 5, 2017. All of the aforementioned patent applications are hereby incorporated by reference in their entireties.

TECHNICAL FIELD

This application relates to the field of communications technologies, and in particular, to a communication method and a communications device.

BACKGROUND

A radio resource control (RRC) inactive state is a terminal communication state newly defined in 5G. In the inactive state, a core network, a base station, and a terminal all retain corresponding context information. However, when moving inside a radio access network (RAN)-based notification area (RNA), the terminal in the inactive state does not feed back a channel quality status to a network side, and after moving out of the RNA, the terminal needs to notify the network that the terminal has moved out of the RNA. The RNA includes one or more cells. If the RNA includes a plurality of cells, the plurality of cells belong to a same base station, or may belong to different base stations, where the different base stations may be base stations of a same radio access Technology (RAT) or base stations of different RATs.

Due to mobility of the terminal in the inactive state, the terminal in the inactive state performs downlink synchronization with a new serving base station (non-anchor base station) through cell reselection. If the terminal in the inactive state needs to transmit data, perform an RNA update, perform a tracking area (TA) update, and/or perform a registration area update, the new serving base station becomes an anchor base station. The new serving base station that becomes an anchor base station needs to allocate a new RNA to the terminal in the inactive state. However, signaling overheads are relatively large in a process in which the new serving base station allocates a new RNA to the terminal in the inactive state.

SUMMARY

Embodiments of this application provide a communication method and a communications device, so that a new RNA is allocated to a terminal in an inactive state after it is determined that a new RNA needs to be allocated to the terminal in the inactive state, thereby reducing signaling overheads.

According to a first aspect, a communication method is provided. In the method, a first base station receives a first message that is used to instruct the first base station to determine whether to allocate a new RNA to a terminal in an inactive state; determines, based on the first message, whether to allocate a new RNA to the terminal in the inactive state; and allocates a new RNA to the terminal in the inactive state after determining to allocate a new RNA to the terminal in the inactive state, so as to reduce signaling overheads.

The first base station may be understood as a new anchor base station of the terminal in the inactive state, and a second base station may be understood as an original anchor base station of the terminal in the inactive state.

In a possible design, the first message that is used to instruct the first base station to determine whether to allocate a new RNA to the terminal in the inactive state may be RNA information sent by the second base station to the first base station, where the RNA information is used to indicate an RNA in which the terminal in the inactive state is currently located. The RNA in which the terminal is currently located may be understood as an RNA that is most recently allocated by a network side to the terminal in the inactive state. The second base station determines the RNA information, and sends the RNA information to the first base station. The first base station receives the RNA information, and may determine, based on the RNA information, whether to allocate a new RNA to the terminal in the inactive state.

The RNA information may be in a form of a cell list, may be in a form of an RNA ID, may be in a form of an RNA ID list, may be a combination of two forms, or may be in another form.

The RNA information is added to and sent in a first request response message sent by the second base station to the first base station, to reduce signaling overheads. The first request response message may be a context request response (UE Context Response) message, may be an RNA update request response message, or certainly may be another message.

The first base station may use one or more of the following specific implementations to determine, based on the RNA information, whether to allocate a new RNA to the terminal in the inactive state: If the first base station determines that a cell that is in a coverage area of the first base station and to which the terminal in the inactive state belongs does not fall within a range of the RNA indicated by the RNA information, the first base station determines to allocate a new RNA to the terminal in the inactive state; or if the first base station determines that a cell that is in a coverage area of the first base station and to which the terminal in the inactive state belongs falls within a range of the RNA indicated by the RNA information, the first base station may determine not to allocate a new RNA to the terminal in the inactive state; or if the first base station determines that a cell that is in a coverage area of the first base station and to which the terminal in the inactive state belongs is on an edge of the RNA, the first base station may determine to allocate a new RNA; or the first base station determines, with reference to the RNA information and other information, whether to allocate a new RNA to the terminal in the inactive state. For example, when the first base station determines that a cell that is in a coverage area of the first base station and to which the terminal in the inactive state belongs falls within a range of the RNA indicated by the RNA information, if the first base station determines that based on a moving speed of the terminal, the terminal moves out of the range of the RNA indicated by the RNA information within a preset time, the first base station may determine to allocate a new RNA, or if the first base station determines that based on a moving speed of the terminal, the terminal does not move out of the range of the RNA indicated by the RNA information within a preset time, the first base station may determine not to allocate a new RNA. For another example, when the first base station determines that a cell that is in a coverage area of the first base station and to which the terminal in the inactive state belongs falls within a range of the RNA indicated by the RNA information, and the cell that is in the coverage area of the first base station and to which the terminal in the inactive state belongs is on an edge of the RNA, if the first base station determines that based on a moving speed of the terminal, the terminal does not move out of the range of the RNA indicated by the RNA information within a preset time, the first base station may determine not to allocate a new RNA.

In another possible design, the first message includes RNA update reason indication information that is sent by the terminal in the inactive state to the first base station, where the RNA update reason indication information is used to indicate whether an RNA update reason is a periodic update or a reason other than periodic update. The terminal in the inactive state sends the RNA update reason indication information to the first base station. The first base station receives the RNA update reason indication information, and determines, based on the RNA update reason indication information, whether to allocate a new RNA to the terminal in the inactive state. The first base station allocates a new RNA to the terminal in the inactive state after determining to allocate a new RNA to the terminal in the inactive state, so as to reduce signaling overheads.

The RNA update reason indication information may be sent by using a second request message that is sent by the terminal to the first base station. The second request message may be an RRC connection setup request message, may be an RRC connection resume request message, or certainly may be another message.

The RNA update reason indication information is used to indicate that the terminal in the inactive state performs a periodic RNA update, or the RNA update reason indication information may be used to indicate that the terminal in the inactive state performs an aperiodic RNA update, or the RNA update reason indication information may be used to indicate that the terminal in the inactive state performs an RNA update because the terminal moves out of a range of an RNA, or the RNA update reason indication information may be used to indicate only that the terminal in the inactive state performs an RNA update, or the RNA update reason indication information may be used to indicate a registration area update or an RNA and TA joint update.

Optionally, the RNA update reason indication information may provide an indication by using one parameter, or may provide an indication by using two parameters. For example, a first parameter is used to indicate that the terminal in the inactive state performs an RNA update, and a second parameter is used to indicate that a type of the RNA update is a periodic RNA update, or an aperiodic RNA update, or an RNA update that is performed because the terminal moves out of the range of the RNA, or an RNA and TA joint update.

If the first base station determines that the RNA update reason indication information is used to indicate that the terminal in the inactive state reports and updates RNA information because the terminal moves out of the range of the RNA, the first base station determines to allocate a new RNA to the terminal in the inactive state. If the first base station determines that the RNA update reason indication information is used to indicate that the terminal in the inactive state periodically reports and updates RNA information, the first base station determines not to allocate a new RNA to the terminal in the inactive state.

According to a second aspect, a communication method is provided. In the method, a first base station may receive a second message that is used to instruct the first base station to determine a communication status of a terminal in an inactive state, and then the first base station determines, based on the second message, that the communication status of the terminal in the inactive state is an inactive state, a connected state, or an idle state. Because the first base station determines the communication status of the terminal in the inactive state, the communication status of the terminal can be accurately determined. In addition, the terminal may be controlled to change the communication status after it is determined that the terminal needs to change the communication status, and the communication status may not be changed when the terminal does not need to change the communication status. This can reduce energy consumption of the terminal.

The first base station may be understood as a new anchor base station of the terminal in the inactive state, and a second base station may be understood as an original anchor base station of the terminal in the inactive state.

In a possible design, in this embodiment of this application, the second message that is used to instruct the first base station to determine the communication status of the terminal in the inactive state may include an active flag, where the active flag is used to indicate whether the terminal in the inactive state needs to enter the connected state.

The active flag may be represented by using a bit. For example, the active flag is represented by using 1 bit. If the bit that represents the active flag is set to 1, it indicates that the terminal in the inactive state needs to enter the connected state. If the bit that represents the active flag is set to 0, it indicates that the terminal in the inactive state does not need to enter the connected state.

That the terminal needs to enter the connected state may mean that the terminal needs to activate (Resume) some or all bearers and/or sessions. The some or all bearers and/or sessions may be resumed in an RNA update process, or may be resumed after an RNA update.

The terminal in the inactive state sends the active flag to the first base station. After receiving the active flag, the first base station may determine the communication status of the terminal in the inactive state based on the active flag.

The active flag may be sent to the first base station by the terminal in the inactive state by using a second request message, for example, by using an RRC Connection Resume Request message. The RRC Connection Resume Request may include the active flag, and may further include the RNA update reason indication information in the first aspect.

If the active flag indicates that the terminal in the inactive state needs to enter the connected state, the first base station determines that the communication status of the terminal in the inactive state is the connected state. The first base station sends, to the terminal in the inactive state, indication information that is used to instruct the terminal to enter the connected state. The indication information that is used to instruct the terminal to enter the connected state may be sent by using a second request response message, for example, an RRC connection resume message sent by the first base station to the terminal in the inactive state. After entering the connected state according to the indication information, the terminal in the inactive state may send an RRC connection resume completed message to the first base station.

In a possible design, when the first base station determines that the communication status of the terminal in the inactive state is the connected state, if the first base station and the second base station are base stations of different RATs, the first base station sends full configuration information to the terminal in the inactive state. The full configuration information may be sent by using a second request response message. For example, the full configuration information is sent by using an RRC connection resume message. The terminal in the inactive state receives the full configuration information sent by the first base station.

If the active flag indicates that the terminal in the inactive state does not need to enter the connected state, the new serving base station determines that the communication status of the terminal in the inactive state is the inactive state. The first base station sends, to the terminal in the inactive state, indication information that is used to instruct the terminal to maintain the inactive state. The first base station may send, by using a second request response message, the indication information that is used to instruct the terminal to maintain the inactive state. For example, the first base station instructs, in the following manner, the terminal to maintain the inactive state: The first base station sends an RRC connection resume message to the terminal in the inactive state, where the RRC connection resume message includes the indication information that is used to instruct the terminal in the inactive state to maintain the inactive state; or the first base station sends an RRC connection release message to the terminal in the inactive state, where the RRC connection release message includes the indication information that is used to instruct the terminal in the inactive state to maintain the inactive state; or the first base station sends an RRC connection suspend message to the terminal in the inactive state.

If the first base station determines that no idle resource is to be allocated to the terminal, the first base station may determine that the communication status of the terminal in the inactive state is the idle state, and send, to the terminal in the inactive state, indication information that is used to instruct the terminal to enter the idle state. The indication information that is used to instruct the terminal to enter the idle state may be sent by using a second request response message. For example, the first base station sends an RRC connection release message to the terminal in the inactive state.

In still another possible design, the second message includes first indication information sent by the second base station to the first base station, where the first indication information is used to indicate that retrieval of context information of the terminal in the inactive state fails.

The terminal in the inactive state sends a second request message to the first base station, the first base station sends a first request message to the second base station, and the second base station obtains, the context information of the terminal in the inactive state based on the first request message, and sends the first indication information to the first base station, where the first indication information indicates that retrieval of the context information of the terminal in the inactive state fails. The first indication information may be sent by using a first request response message. After receiving the first indication information that is used to indicate that retrieval of the context information of the terminal in the inactive state fails, the first base station determines to set the communication status of the terminal in the inactive state to the idle state, and sends, to the terminal in the inactive state, indication information that is used to indicate that the communication status of the terminal in the inactive state is the idle state. For example, the first base station may send an RRC connection release message to the terminal in the inactive state.

In a possible implementation, when determining to set the communication status of the terminal in the inactive state to the idle state, the first base station sends a context release request message or second indication information to the second base station, where the second indication information is used to indicate that the first base station sets the communication status of the terminal in the inactive state to the idle state, so that the second base station can release the context information related to the terminal whose context information fails to be obtained by the second base station or release a connection between a core network and the base station that is related to the terminal.

In still another possible design, the second message sent by the second base station to the first base station may include protocol data unit (PDU) session information and network slice information of a PDU session that are sent by the second base station.

The second base station sends the PDU session information and the network slice information of the PDU session to the first base station. The network slice information and the PDU session information may be sent by using a first request response message such as a context response message. The first base station receives the PDU session information and the network slice information of the PDU session that are sent by the second base station, and determines, based on the PDU session information and the network slice information of the PDU session that are received, whether a network slice of the PDU session is supported. When determining that some network slices of the PDU session are not supported or none of network slices of the PDU session is supported, the first base station sends an RRC connection resume message to the terminal in the inactive state, where the RRC connection resume message carries full configuration information, or the first base station sends an RRC connection setup message to the terminal in the inactive state.

The network slice information may be represented by using at least one of the following parameters: a network slice identity (Network Slice ID, Slice ID), single network slice selection assistance information (S-NSSAI), S-NSSAI group information, and a temporary identity (Temporary ID).

In yet another possible design, the second message may further include network slice remapping policy information sent by the second base station to the first base station.

The second base station sends the network slice remapping policy information to the first base station, where the network slice remapping policy information is used to indicate at least one flow, session, or radio bearer for the terminal in the inactive state in a coverage area of the second base station; or may be used to indicate at least one new network slice to which a flow, a session, or a radio bearer supported by the terminal in the inactive state is remapped from at least one original network slice. The network slice remapping policy information may be a set of network slice indication information. For example, if a current flow, session, or radio bearer is originally mapped to a first network slice, the network slice remapping policy information indicates that the current flow, session, or radio bearer may be remapped to a second network slice, or remapped to a second network slice and a third network slice, or the like.

The network slice remapping policy information may be sent by using a first request response message.

After the first base station receives the network slice remapping policy information, the PDU session information, and the network slice information corresponding to the PDU session that are sent by the second base station, if the first base station determines, based on the network slice information and the protocol data unit PDU session information, that some network slices of the PDU session are not supported or none of network slices of the PDU session is supported, and determines, based on the network slice remapping policy information, that the unsupported network slices of the PDU session cannot be remapped to other network slices, the first base station sends a radio resource control connection setup message, a radio resource control connection resume message carrying full configuration information, or a radio resource control connection release message to the terminal in an inactive state.

According to a third aspect, a communication method is provided. In the method, a terminal in an inactive state sends identity information of the terminal in the inactive state to a first base station. The identity information may uniquely identify the inactive terminal in an RNA range. In addition, an anchor base station of the inactive terminal can find, by using the identity information, context information corresponding to the terminal. The identity information may be referred to as a resume ID. The first base station receives the resume ID sent by the terminal in the inactive state, and sends identity information to a second base station. The identity information sent by the first base station to the second base station includes the resume ID that is sent by the terminal in the inactive state and received by the first base station, and may further include at least one of an identity of the first base station, an identity of a cell to which the terminal in the inactive state belongs, and an identity of an RNA in which the first base station is currently located. The second base station receives the identity of the RNA in which the first base station is currently located, and can recognize the RNA to which the first base station belongs, so as to determine whether the first base station needs to be set as a new anchor base station. If the second base station determines that the first base station does not need to be set as a new anchor base station, in other words, the anchor base station is not updated in a current RNA update process, the second base station sends third indication information to the first base station, where the third indication information is used to indicate whether the anchor base station needs to be updated. If the second base station determines that the anchor base station does not need to be updated, the second base station sends the third indication information to the first base station, to indicate that the anchor base station is not to be updated.

Optionally, the first base station receives the third indication information sent by the second base station, and may send, to the terminal in the inactive state, indication information that is used to indicate whether the anchor base station needs to be updated. In this manner, it is ensured that the anchor base station of the terminal in the inactive state is not updated, thereby avoiding an unnecessary new RNA allocation process and reducing signaling overheads.

According to a fourth aspect, a communications device is provided. The communications device has functions of implementing the first base station in the foregoing method designs. The functions may be implemented by using hardware, or may be implemented by executing corresponding software by hardware. The hardware or software includes one or more modules corresponding to the foregoing functions. The module may be software and/or hardware.

In a possible design, the communications device applied to the first base station includes a receiver and a processor, and may further include a transmitter. Functions of the receiver, the processor, and the transmitter may be corresponding to the method steps, and details are not described herein again.

According to a fifth aspect, a communications device is provided. The communications device has functions of implementing the second base station in the foregoing method designs. The functions may be implemented by using hardware, or may be implemented by executing corresponding software by hardware. The hardware or software includes one or more modules corresponding to the foregoing functions. The module may be software and/or hardware.

In a possible design, the communications device applied to the second base station includes a processor and a transmitter, and may further include a receiver. Functions of the processor, the transmitter, and the receiver may be corresponding to the method steps, and details are not described herein again.

According to a sixth aspect, a communications device is provided. The communications device has functions of implementing the terminal in the inactive state in the foregoing method designs. The functions may be implemented by using hardware, or may be implemented by executing corresponding software by hardware. The hardware or software includes one or more modules corresponding to the foregoing functions. The module may be software and/or hardware.

In a possible design, the communications device applied to the terminal in the inactive state includes a processor and a transmitter, and may further include a receiver. Functions of the processor, the transmitter, and the receiver may be corresponding to the method steps, and details are not described herein again.

According to a seventh aspect, a first base station is provided. The first base station includes a processor, a transmitter, and a receiver, and may further include a memory. The memory is configured to be coupled to the processor, and stores a necessary program instruction and necessary data of the first base station. The processor, the transmitter, the receiver, and the memory are connected. The memory is configured to store an instruction. The processor is configured to execute the instruction stored in the memory, to control the transmitter and the receiver to receive and send signals, and implement steps that are performed by the first base station to perform corresponding functions in any one of the first aspect, the second aspect, the third aspect, and the possible designs of the aspects.

According to an eighth aspect, a second base station is provided. The second base station includes a processor and a transceiver, and may further include a memory. The memory is configured to be coupled to the processor, and stores a necessary program instruction and necessary data of the second base station. The processor, the transceiver, and the memory are connected. The memory is configured to store an instruction. The processor is configured to execute the instruction stored in the memory, to control the transceiver to receive and send signals, and implement the method performed by the second base station in any one of the first aspect, the second aspect, the third aspect, and the possible designs of the aspects.

According to a ninth aspect, a terminal is provided. The terminal includes a transmitter, a receiver, and a processor, and may further include a memory. The memory is configured to be coupled to the processor, and stores a necessary program instruction and necessary data of the terminal. The processor executes the instruction stored in the memory, to perform functions of the terminal in the inactive state in any one of the first aspect, the second aspect, the third aspect, and the possible designs of the aspects.

According to a tenth aspect, a communications system is provided, including the first base station in the seventh aspect, the second base station in the eighth aspect, and one or more terminals in the ninth aspect.

According to an eleventh aspect, a computer storage medium is provided, configured to store some instructions. When these instructions are being executed, any method related to the terminal in the inactive state, the first base station, or the second base station in any one of the first aspect, the second aspect, the third aspect, and the possible designs of the aspects can be implemented.

According to a twelfth aspect, a computer program product is provided, configured to store a computer program. The computer program is used to perform any method related to the terminal in the inactive state, the first base station, or the second base station in any one of the first aspect, the second aspect, the third aspect, and the possible designs of the aspects.

In the embodiments of this application, the first base station may receive the first message that is used by the first base station to determine whether to allocate a new RNA to the terminal in the inactive state; then determine, based on the first message, whether to allocate a new RNA to the terminal in the inactive state; and allocate a new RNA to the terminal in the inactive state after determining to allocate a new RNA to the terminal in the inactive state, so as to reduce signaling overheads.

In the embodiments of this application, the first base station may receive the second message that is used to instruct the first base station to determine the communication status of the terminal in the inactive state, and then the first base station determines, based on the second message, that the communication status of the terminal in the inactive state is the inactive state, the connected state, or the idle state. Because the first base station determines the communication status of the terminal in the inactive state, the communication status of the terminal can be accurately determined. In addition, the terminal may be controlled to change the communication status after it is determined that the terminal needs to change the communication status, and the communication status may not be changed when the terminal does not need to change the communication status. This can reduce energy consumption of the terminal.

DETAILED DESCRIPTION OF ILLUSTRATIVE EMBODIMENTS

Figure 1:
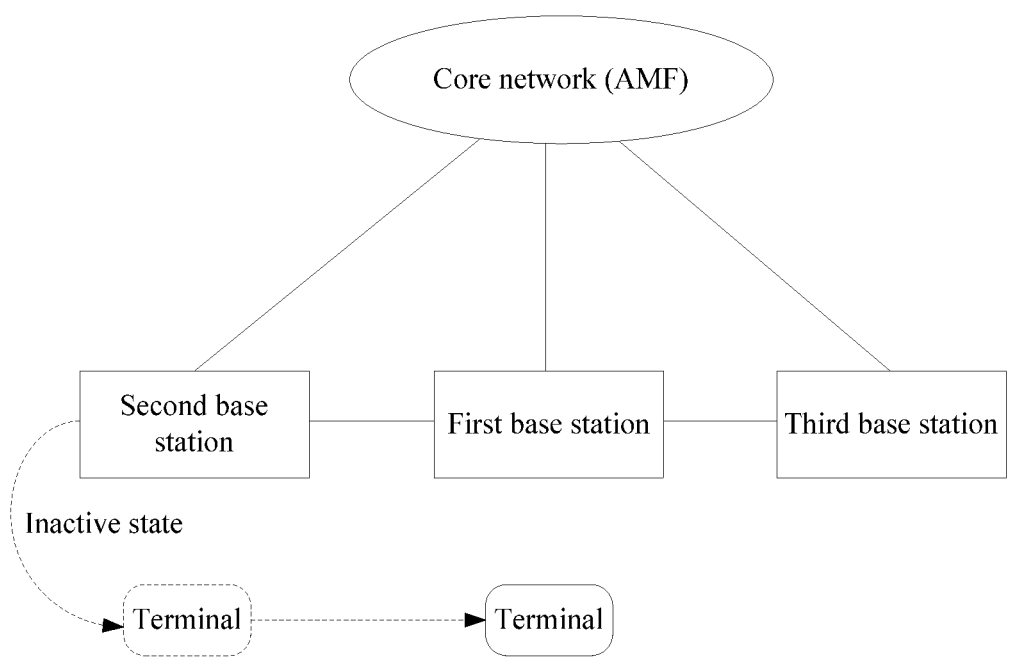
FIG. 1 is a diagram of a network architecture to which embodiments of this application are applied.

The following describes technical solutions of the embodiments in this application with reference to accompanying drawings.

Some terms in this application are first described, to help understanding of a person skilled in the art.

(1) A base station (BS), also referred to as a base station device, is an apparatus that is deployed on a radio access network to provide a wireless communication function. For example, in a 2G network, devices that provide a base station function include a base transceiver station (BTS) and a base station controller (BSC). In a 3G network, devices that provide a base station function include a NodeB and a radio network controller (RNC). In a 4G network, devices that provide a base station function include an evolved NodeB (eNB). In a wireless local area network (WLAN), a device that provides a base station function is an access point (AP). In future 5G new radio (NR), devices that provide a base station function include a next generation NodeB (gNB).

(2) A terminal is a device that provides voice and/or data connectivity for a user, and may include various handheld devices, in-vehicle devices, wearable devices, and computing devices that have a wireless communication function, or other processing devices connected to a wireless modem, and various forms of user equipment (UE), mobile stations (MS), terminal equipment, transmission and reception points (TRP), or transmission point (TP), and the like.

(3) Interaction in this application is a process in which two parties of the interaction transfer information to each other, where the information transferred herein may be the same or different. For example, if the two parties of the interaction are a base station 1 and a base station 2, the base station 1 may request information from the base station 2, and the base station 2 provides the base station 1 with the information requested by the base station 1. Certainly, the base station 1 and the base station 2 may alternatively request information from each other, where the information requested herein may be the same or different.

(4) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(5) Terms "network" and "system" are often used interchangeably, but a person skilled in the art can understand meanings thereof. Information, signal, message, and channel may be interchangeably used on some occasions. It should be noted that expressed meanings are consistent when differences are not emphasized. "Of", "relevant" and "corresponding" may be interchangeably used sometimes. It should be noted that expressed meanings are consistent when differences are not emphasized.

(6) An inactive state, also referred to as an RRC inactive state, is a communication state newly defined in 5G. The communication state may be used as an independent communication state, or may be understood as a communication sub-state of a connected (Active) state or a communication sub-state of an idle state. In this application, the inactive state may be considered as an independent communication state, and a terminal in the inactive state has the following characteristics:

A. Context information of the terminal on an access stratum (AS) is retained on both the terminal and a base station side, where an anchor base station on a RAN side stores the AS context information of the terminal, or the anchor base station may transmit the context of the terminal to another base station for storage. The anchor base station is a base station that retains a connection between a core network and a RAN side control plane for the inactive terminal. The anchor base station may usually be understood as a base station that controls the terminal to change from the connected state to the inactive state. However, other situations are not excluded. For example, in an RNA update process, an inactive terminal without data transmission still maintains the inactive state after an RNA update, instead of first changing to the connected state. In this case, although the base station performs only reconfiguration on the terminal without performing status change on the terminal, because a connection between a core network side and an RNA side is changed, the base station that controls the terminal to maintain the inactive state is also referred to as an anchor base station.

B. When the terminal changes from the inactive state to the RRC connected state, a link between the anchor base station and a core network control plane network element does not need to be reactivated. For example, a link between a base station side and a core network side does not need to be reactivated.

C. The terminal does not transmit data in the inactive state.

(7) RAN-based notification area (RNA)

The RNA includes one or more cells. If the RNA includes a plurality of cells, the plurality of cells belong to a same gNB, or may belong to different base stations. The different base stations may be base stations of a same RAT, or may be base stations of different RATs. For example, the base station may be an eNB in a 4.5G network, or may be a gNB in a 5G network. When moving inside the RNA, the terminal in the inactive state may not send a measurement report to the network side, but performs only cell reselection, and periodically reports RNA update information. When moving to a cell out of the RNA, the terminal in the inactive state needs to report RNA update information, and perform a location update operation. The location update operation is similar to a tracking area update (TAU) in a long term evolution (LTE) network.

(8) Communication status change

After the inactive state is introduced, there are the following status change scenarios: changing from the connected state to the inactive state, changing from the connected state to the idle state, changing from the inactive state to the idle state, changing from the idle state to the connected state, and changing from the inactive state to the connected state.

The terminal in the inactive state inevitably needs to perform an RNA update and communication status change. Usually, when the terminal in the inactive state moves from the anchor base station to a new serving base station, and needs to interact with a network (for example, an RNA update or data transmission), the new serving base station to which the terminal moves allocates a new RNA to the terminal in the inactive state. The terminal in the inactive state first changes to the connected state, and if there is no data to be transmitted, the terminal then changes to the inactive state. However, in many actual communication scenarios, the new serving base station does not need to allocate a new RNA, and the terminal in the inactive state does not need to perform status change. For example, if the terminal moves to the new serving base station, but still moves in an original RNA, the new serving base station does not need to allocate a new RNA. For another example, after an RNA update, if the terminal in the inactive state has no data to be transmitted, the terminal does not need to change to the connected state.

In view of this, the embodiments of this application provide a communication method, so that a new serving base station can allocate a new RNA to a terminal in an inactive state after determining to allocate a new RNA to the terminal in the inactive state; and the new serving base station can accurately determine whether the terminal in the inactive state needs to change a communication status.

The embodiments of this application are described below by using a 5G network scenario in a wireless communications network as an example. It should be noted that solutions in the embodiments of this application may also be applied to another wireless communications network, and a corresponding name may also be replaced with a name of a corresponding function in the another wireless communications network.

FIG. 1 is a schematic structural diagram of a communications system to which this application is applicable. The communications system shown in FIG. 1 includes terminals, base stations, and a core network. The base stations include a first base station, a second base station, and a third base station. The first base station and the second base station are of a same radio access technology, and a radio access technology of the third base station is different from the radio access technology of the first base station and the second base station. For example, the first base station and the second base station may be understood as gNodeB (gNB) in 5G, and the third base station may be understood as an eNodeB (eNB) in 4G or 4.5G. The third base station may be a base station connected to an evolved universal terrestrial radio access network (E-UTRAN) of a 5G core network, and can set the terminal to an inactive state or a similar state. The core network may include an access and mobility management function (AMF). The AMF may be understood as a core network control plane function, and provides the terminal with a mobility management function and an access management function.

In FIG. 1, if a terminal in a connected state camps on a coverage area of the second base station, and has not transmitted data in a specified time, the second base station may set the terminal to the inactive state. The second base station that sets the terminal to the inactive state from the connected state is a last base station that serves the terminal in the connected state. The last base station that serves the terminal in the connected state may be referred to as an anchor base station. The anchor base station retains context information of the terminal. The terminal in the inactive state has mobility. If the terminal in the inactive state moves from the coverage area of the second base station to a coverage area of the first base station, the terminal in the inactive state may use the first base station as a new serving base station, and keep downlink synchronization with the first base station, or keep synchronization with a cell of the first base station, receive a broadcast signal of the first base station, and may interact with the core network by using the first base station. If the terminal in the inactive state needs to transmit data or perform an RNA update, the new serving base station may become a new anchor base station, and allocate a new RNA to the terminal in the inactive state. In other words, the first base station may be understood as a new anchor base station of the terminal in the inactive state, or a potential new anchor base station that may become a new anchor base station of the terminal in the inactive state, and the second base station may be understood as an original anchor base station of the terminal in the inactive state.

In the embodiments of this application, the first base station may receive a first message that is used by the first base station to determine whether to allocate a new RNA to the terminal in the inactive state; then determine, based on the first message, whether to allocate a new RNA to the terminal in the inactive state; and allocate a new RNA to the terminal in the inactive state after determining to allocate a new RNA to the terminal in the inactive state, so as to reduce signaling overheads.

Figure 2:
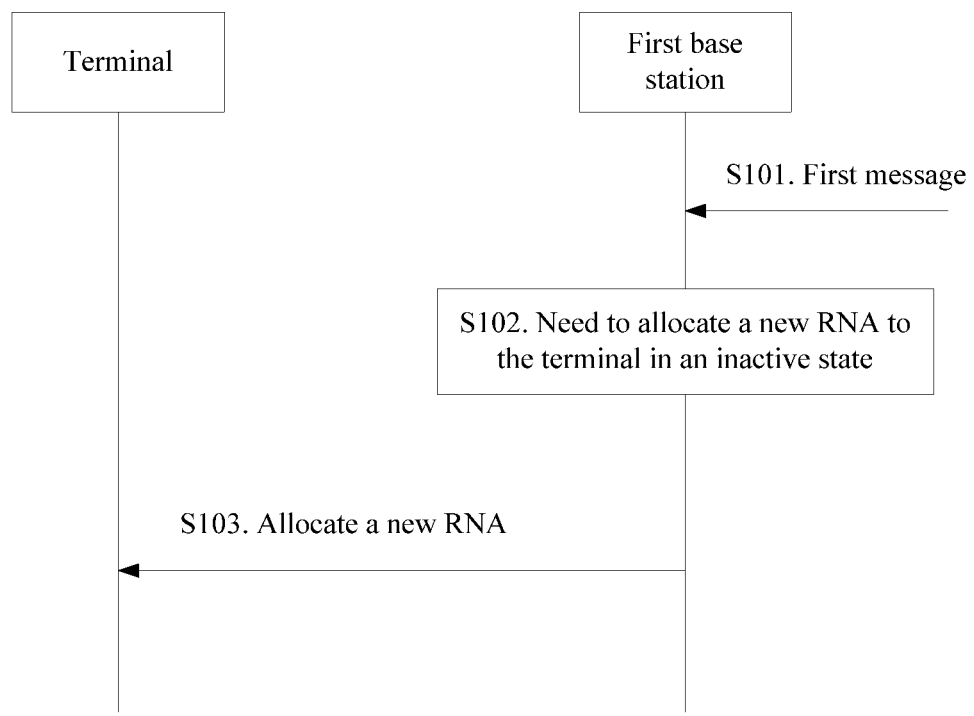
FIG. 2 is a flowchart of implementation of determining whether to allocate a new RNA to a terminal in an inactive state according to an embodiment of this application.

FIG. 2 is a flowchart of a communication method according to an embodiment of this application. As shown in FIG. 2, the method includes the following steps.

S101. A first base station receives a first message, where the first message is used by the first base station to determine whether to allocate a new RNA to a terminal in an inactive state.

S102. The first base station determines, based on the first message, whether to allocate a new RNA to the terminal in the inactive state.

S103. If the first base station determines, based on the first message, to allocate a new RNA to the terminal in the inactive state, the first base station allocates a new RNA to the terminal in the inactive state. The terminal in the inactive state updates retained RNA information based on the new RNA allocated by the first base station.

In a possible implementation, the first message received by the first base station may be RNA information sent by a second base station to the first base station, where the RNA information is used to indicate an RNA in which the terminal in the inactive state is currently located, and the first base station may determine, based on the RNA information, whether to allocate a new RNA to the terminal in the inactive state.

Figure 3:
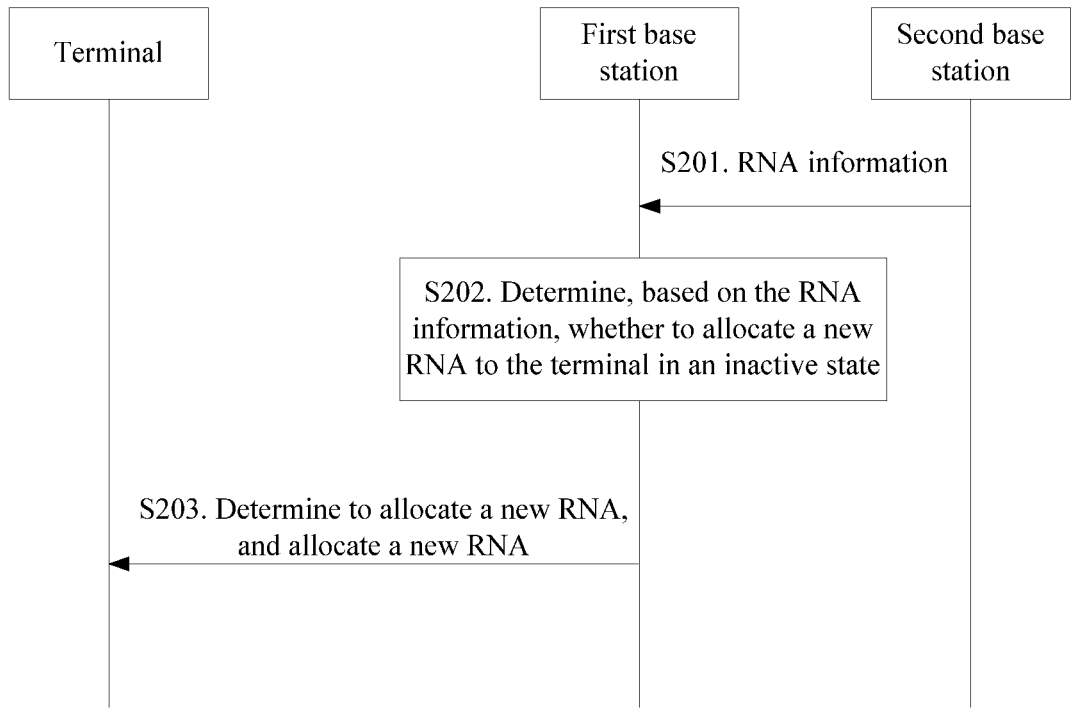
FIG. 3 is a flowchart of implementation of determining, based on RNA information, whether to allocate a new RNA to a terminal in an inactive state according to an embodiment of this application.

FIG. 3 is a flowchart of implementation of determining, by a first base station based on RNA information, whether to allocate a new RNA to a terminal in an inactive state. As shown in FIG. 3, the following steps are included.

S201. A second base station sends RNA information to the first base station, where the RNA information is used to indicate an RNA in which the terminal in the inactive state is currently located.

The RNA information may be in a form of a cell list, may be in a form of an RNA identity (ID), may be in a form of an RNA ID list, may be a combination of two forms, or may be in another form.

S202. The first base station receives the RNA information sent by the second base station, and determines, based on the RNA information, whether to allocate a new RNA to the terminal in the inactive state.

In this embodiment of this application, the RNA information sent by the second base station includes the RNA in which the terminal in the inactive state is currently located. The RNA in which the terminal is currently located may be understood as an RNA that is most recently allocated by a network side to the terminal in the inactive state. Therefore, the first base station may determine, based on the RNA information, whether to allocate a new RNA to the terminal in the inactive state.

There may be a plurality of specific implementations in which the first base station determines, based on the RNA information, whether to allocate a new RNA to the terminal in the inactive state. For example, the plurality of specific implementations may be one or more of the following implementations. Certainly, the following determining manners are merely used as examples for description, and do not constitute a limitation.

In an implementation, the first base station may determine whether a cell that is in a coverage area of the first base station and to which the terminal in the inactive state belongs falls within a range of the RNA indicated by the RNA information. If the first base station determines that the cell that is in the coverage area of the first base station and to which the terminal in the inactive state belongs does not fall within the range of the RNA indicated by the RNA information, the first base station determines to allocate a new RNA to the terminal in the inactive state.

In another implementation, if the first base station determines that the cell that is in the coverage area of the first base station and to which the terminal in the inactive state belongs falls within the range of the RNA indicated by the RNA information, the first base station may determine not to allocate a new RNA to the terminal in the inactive state. Certainly, when the first base station determines that the cell that is in the coverage area of the first base station and to which the terminal in the inactive state belongs falls within the range of the RNA indicated by the RNA information, the first base station may alternatively determine not to allocate a new RNA to the terminal in the inactive state. For example, if the cell that is in the coverage area of the first base station and to which the terminal in the inactive state belongs is on an edge of the RNA, a new RNA may need to be allocated.

In still another implementation, the first base station may determine, with reference to the RNA information and other information, whether to allocate a new RNA to the terminal in the inactive state. For example, the first base station may determine, with reference to the RNA information and a moving speed of the terminal, whether to allocate a new RNA to the terminal in the inactive state. For example, when the first base station determines that a cell that is in a coverage area of the first base station and to which the terminal in the inactive state belongs falls within a range of the RNA indicated by the RNA information, if the first base station determines that based on the moving speed of the terminal, the terminal moves out of the range of the RNA indicated by the RNA information within a preset time, the first base station may determine to allocate a new RNA, or if the first base station determines that based on the moving speed of the terminal, the terminal does not move out of the range of the RNA indicated by the RNA information within a preset time, the first base station may determine not to allocate a new RNA. For another example, when the first base station determines that a cell that is in a coverage area of the first base station and to which the terminal in the inactive state belongs falls within a range of the RNA indicated by the RNA information, and the cell that is in the coverage area of the first base station and to which the terminal in the inactive state belongs is on an edge of the RNA, if the first base station determines that based on the moving speed of the terminal, the terminal does not move out of the range of the RNA indicated by the RNA information within a preset time, the first base station may determine not to allocate a new RNA.

S203. If the first base station determines, based on the RNA information, to allocate a new RNA to the terminal in the inactive state, the first base station allocates a new RNA to the terminal in the inactive state. The terminal in the inactive state updates retained RNA information based on the new RNA allocated by the first base station.

In this embodiment of this application, in some scenarios, after receiving a request message sent by the terminal, the first base station sends a request message to the second base station. For example, because the terminal in the inactive state moves to the first base station and needs to send data, when the first base station is different from the second base station, the first base station sends a request message to the second base station. The first base station may be a base station inside the RNA or a base station outside the RNA. For another example, because the terminal in the inactive state moves to the first base station and needs to perform a periodic RNA update, or because the terminal in the inactive state moves to the first base station, and a cell that is in a coverage area of the first base station and to which the terminal in the inactive state belongs is deployed outside a coverage area of the RNA of the inactive terminal (in other words, the terminal moves out of the coverage area of the RNA, and therefore needs to perform an RNA update), the first base station sends a request message to the second base station. Certainly, the first base station may further send a request message to the second base station for another reason. This is not limited in this application.

After receiving the request message sent by the first base station, the second base station sends a request response message to the first base station. In this embodiment of this application, to reduce information element overheads, the RNA information may be carried in the request response message sent by the second base station to the first base station.

For ease of description, in this application, the request message sent by the first base station to the second base station may be referred to as a first request message, and the request response message sent by the second base station to the first base station may be referred to as a first request response message. The first request message may be a UE context request message or an RNA update request message. The first request response message may be a context request response message or an RNA update request response message. The request message sent by the terminal to the first base station is referred to as a second request message, and a request response message sent by the first base station to the terminal is referred to as a second request response message.

Figure 4:
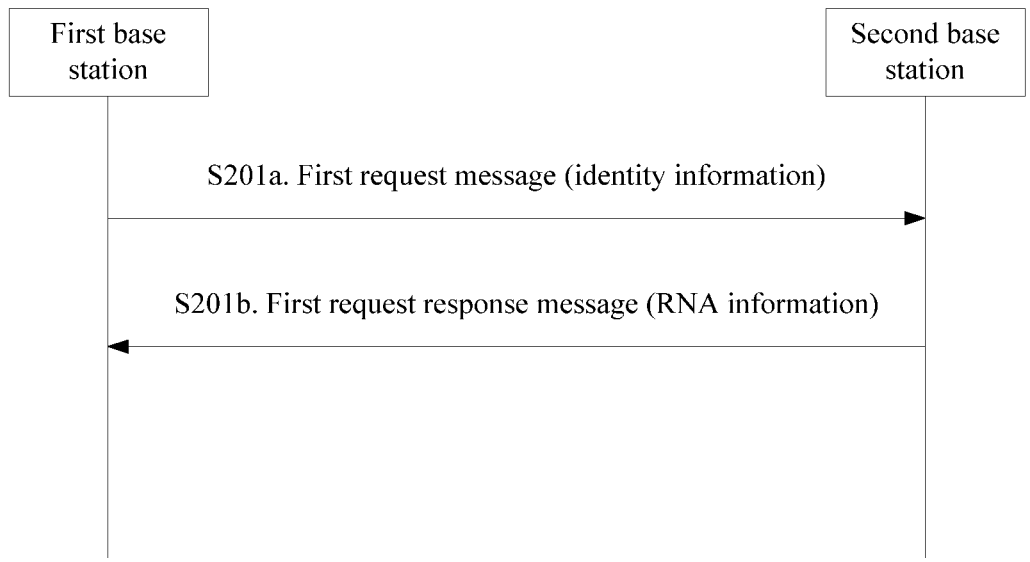
FIG. 4 is a flowchart of obtaining RNA information according to an embodiment of this application.

FIG. 4 is a flowchart of implementation of obtaining, by a first base station, RNA information by using a first request response message according to an embodiment of this application. As shown in FIG. 4, the following steps are included.

S201a. The first base station sends a first request message to a second base station.

In this embodiment of this application, the first request message sent by the first base station to the second base station may include identity information allocated by a network side to a terminal in an inactive state. The identity information of the terminal in the inactive state may be understood as information for uniquely identifying the inactive terminal in an RNA range. In addition, an anchor base station of the inactive terminal can find, by using the identity information, context information corresponding to the terminal. The identity information is referred to as a resume ID in the following description.

The second base station may determine, based on the resume ID, RNA information and context information that are retained by the terminal in the inactive state.

S201b. The second base station receives the first request message sent by the first base station, and sends a first request response message to the first base station.

In this embodiment of this application, the first request response message sent by the second base station to the first base station may include the current RNA information of the terminal.

In this embodiment of this application, the first base station may determine, by using the RNA information, whether the first base station is a base station on an edge of an RNA of the terminal. If yes, a new RNA may need to be allocated to the terminal; otherwise, a new RNA may not need to be allocated to the terminal. When no new RNA needs to be allocated, air interface resources can be reduced compared with the prior art.

Figure 5:
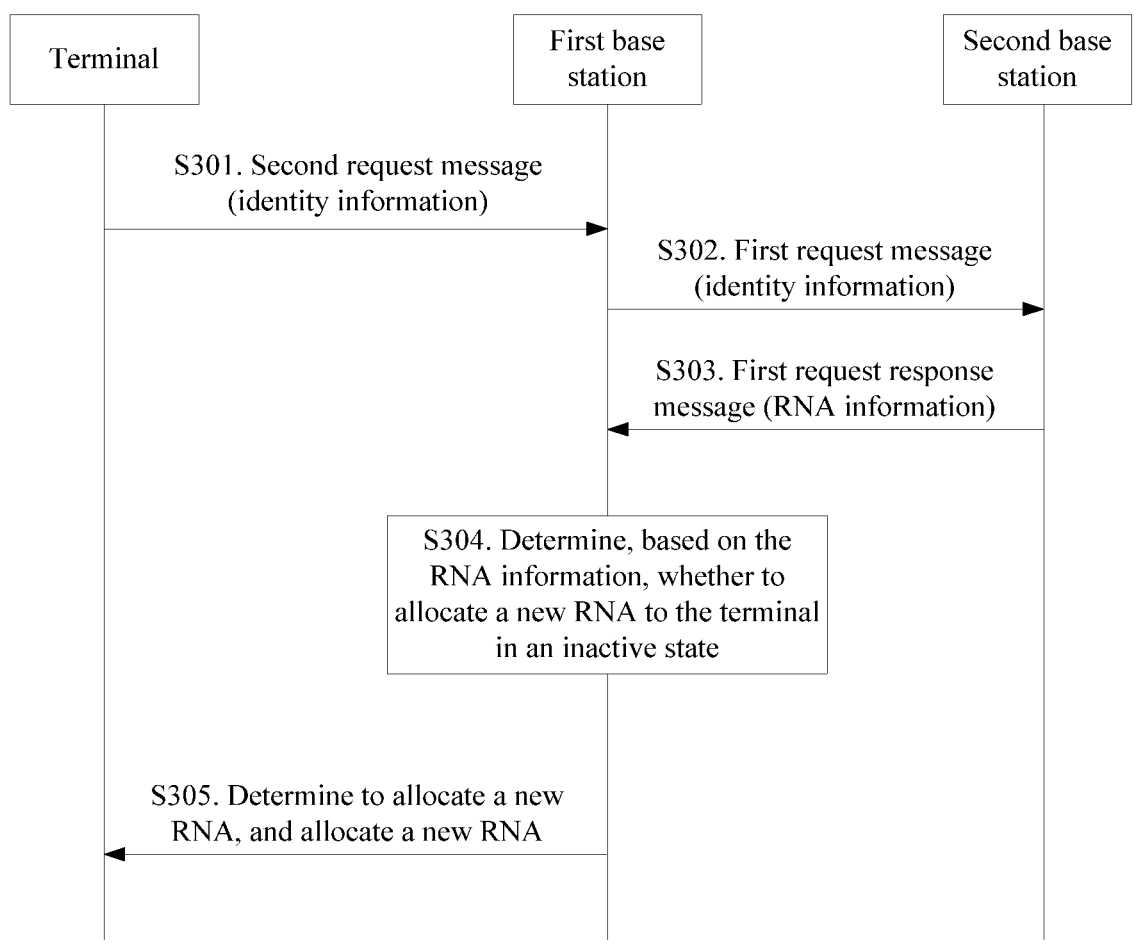
FIG. 5 is another flowchart of implementation of determining, based on RNA information, whether to allocate a new RNA to a terminal in an inactive state according to an embodiment of this application.

FIG. 5 is a flowchart of implementation of obtaining, by a first base station, RNA information by using a first request response message and determining whether to allocate a new RNA to a terminal in an inactive state according to an embodiment of this application. As shown in FIG. 5, the following steps are included.

S301. The terminal in the inactive state sends a second request message to the first base station.

In this embodiment of this application, the second request message sent by the terminal in the inactive state to the first base station may include identity information, such as a resume ID, allocated by a network side to the terminal in the inactive state. The first base station may determine an original anchor base station (a second base station) of the terminal in the inactive state based on the identity information, and send a first request message to the second base station.

S302. After receiving the second request message, the first base station sends the first request message to the second base station.

Steps S303, S304, and S305 are the same as steps S201b, S202, and S203, and details are not described herein again.

In this embodiment of this application, the first base station may determine, by using the RNA information, whether the first base station is a base station on an edge of an RNA of the terminal. If yes, a new RNA may need to be allocated to the terminal; otherwise, a new RNA may not need to be allocated to the terminal. When no new RNA needs to be allocated, air interface resources can be reduced compared with the prior art.

Further, if the process in which the first base station determines whether to allocate a new RNA is included in an RNA update process, the first base station may further determine whether an RNA update is a periodic RNA update or an update that is performed because the terminal moves out of a range of the RNA.

In another possible implementation in this embodiment of this application, the RNA information may include RNA update reason indication information sent by the terminal in the inactive state to the first base station, and the first base station determines, based on the RNA update reason indication information, whether to allocate a new RNA to the terminal in the inactive state.

Figure 6:
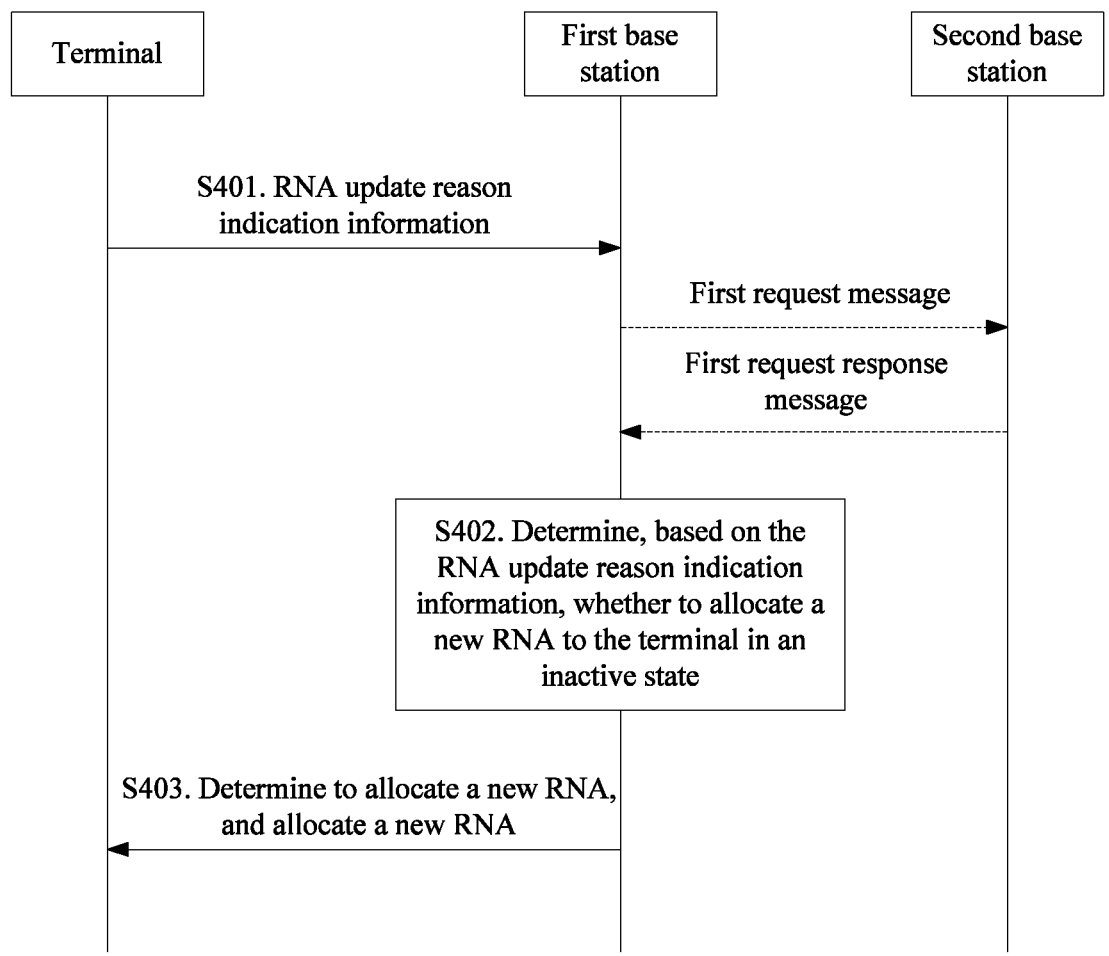
FIG. 6 is a flowchart of implementation of determining, based on RNA update reason indication information, whether to allocate a new RNA according to an embodiment of this application.

FIG. 6 is a flowchart of implementation of determining, by a first base station based on RNA update reason indication information, whether to allocate a new RNA according to an embodiment of this application. As shown in FIG. 6, the following steps are included.

S401. A terminal in an inactive state sends the RNA update reason indication information to the first base station.

The RNA update reason indication information is used to indicate whether an RNA update reason is a periodic update or another reason.

Specifically, the RNA update reason indication information is used to indicate that the terminal in the inactive state performs a periodic RNA update, or the RNA update reason indication information may be used to indicate that the terminal in the inactive state performs an aperiodic RNA update, or the RNA update reason indication information may be used to indicate that the terminal in the inactive state performs an RNA update because the terminal moves out of a range of an RNA, or the RNA update reason indication information may be used to indicate only that the terminal in the inactive state performs an RNA update, or the RNA update reason indication information may be used to indicate a registration area update or an RNA and TA joint update.

Specifically, the RNA update reason indication information may provide an indication by using only one parameter, or may provide an indication by using two parameters. For example, a first parameter is used to indicate that the terminal in the inactive state performs an RNA update, and a second parameter is used to indicate that a type of the RNA update is a periodic RNA update, or an aperiodic RNA update, or an RNA update that is performed because the terminal moves out of the range of the RNA, or an RNA and TA joint update.

S402. The first base station determines, based on the RNA update reason indication information, whether to allocate a new RNA to the terminal in the inactive state.

If the first base station determines that the RNA update reason indication information is used to indicate that the terminal in the inactive state reports and updates RNA information because the terminal moves out of the range of the RNA, the first base station determines to allocate a new RNA to the terminal in the inactive state. If the first base station determines that the RNA update reason indication information is used to indicate that the terminal in the inactive state periodically reports and updates RNA information, the first base station determines not to allocate a new RNA to the terminal in the inactive state. Certainly, the first base station may alternatively determine to allocate a new RNA. If the first base station determines that the RNA update reason indication information is used to indicate an update caused by another reason, the first base station may determine to allocate a new RNA to the terminal in the inactive state.

S403. When determining, based on the RNA update reason indication information, to allocate a new RNA to the terminal in the inactive state, the first base station allocates a new RNA to the terminal in the inactive state. The terminal in the inactive state updates retained RNA information based on the new RNA allocated by the first base station.

Further, in this embodiment of this application, the terminal in the inactive state may send a request message to the first base station, and the first base station sends a request response message to the terminal in the inactive state. In this embodiment of this application, for ease of description, the request message sent by the terminal in the inactive state to the first base station may be referred to as a second request message, and the request response message sent by the first base station to the terminal in the inactive state may be referred to as a second request response message.

The second request message may be an RRC connection setup request message or an RRC connection resume request message. The second request response message may be an RRC connection resume message, an RRC connection suspend message, an RRC connection reconfiguration message, an RRC connection release message, an RRC connection setup message, or a new message.

In this embodiment of this application, to reduce signaling overheads, the RNA update reason indication information may be carried in the second request message sent by the terminal in the inactive state to the first base station.

Further, the second request message sent by the terminal in the inactive state to the first base station may further include identity information, such as a resume ID, allocated by a network side to the terminal in the inactive state.

In FIG. 6, the first base station may send a first request message to a second base station, and the second base station feeds back a first request response message to the first base station. The first request message may include the resume ID. The first request message may be a context request message, and the first request response message may be a context response message, so that the first base station obtains context information of the terminal in the inactive state.

Figure 7:
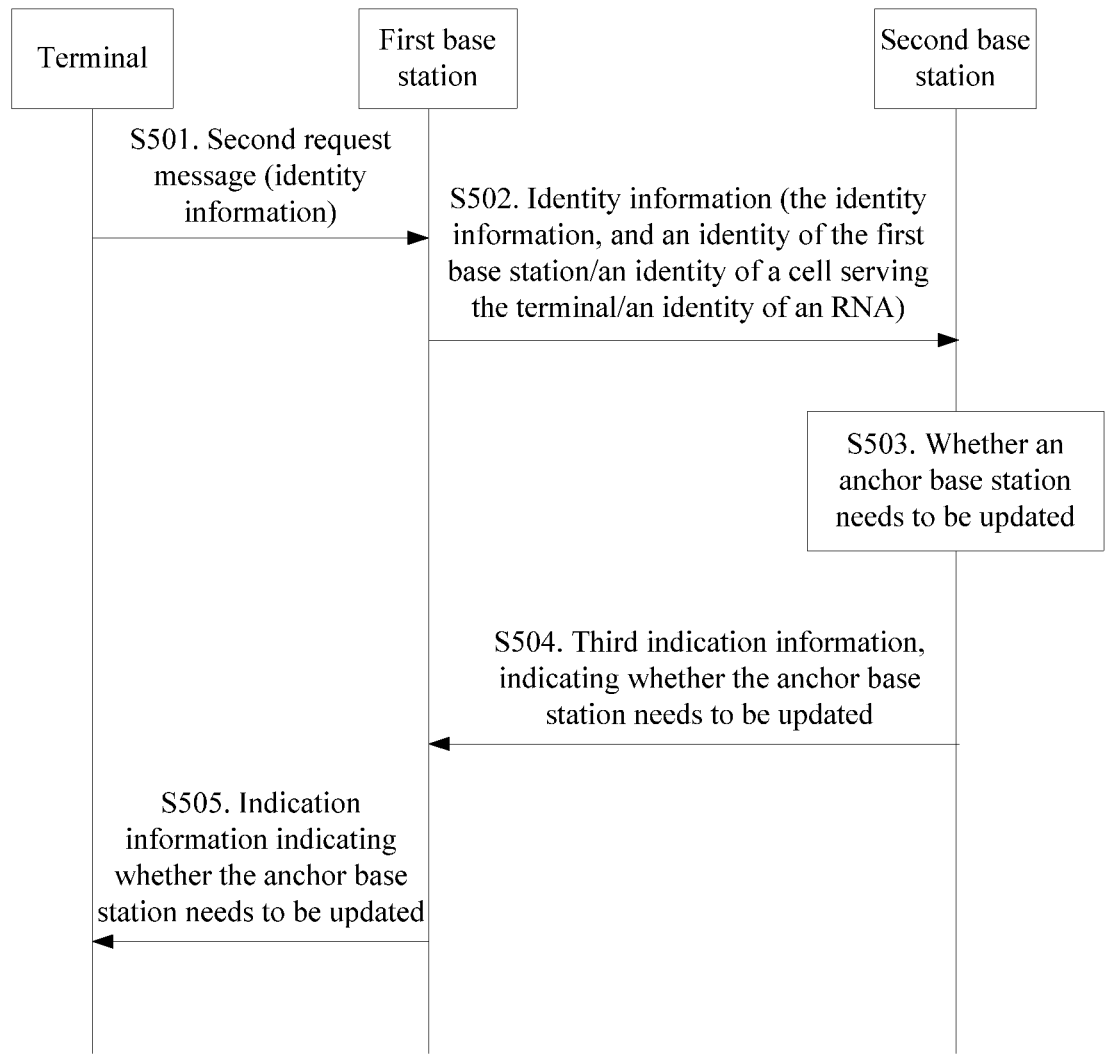
FIG. 7 is another flowchart of implementation of determining whether to allocate a new RNA to a terminal in an inactive state according to an embodiment of this application.

FIG. 7 is another flowchart of implementation of determining, by a first base station, whether to allocate a new RNA according to an embodiment of this application. As shown in FIG. 7, the following steps are included.

S501. A terminal in an inactive state sends identity information of the terminal in the inactive state to the first base station.

The identity information, for example, a resume ID, may be carried in a second request message sent by the terminal in the inactive state to the first base station.

S502. The first base station receives the resume ID sent by the terminal in the inactive state, and sends identity information to a second base station.

The identity information sent by the first base station to the second base station includes the resume ID that is sent by the terminal in the inactive state and received by the first base station.

The identity information sent by the first base station to the second base station may further include an identity of the first base station, which, for example, may be in a form of a first base station ID, or may be in another form. The second base station receives the identity of the first base station, and can recognize the first base station. The identity information sent by the first base station to the second base station may also include an identity of a cell to which the terminal in the inactive state belongs, where one base station may serve a plurality of cells. Cell identity information may be a physical cell identity (PCI) or a global cell identity. The second base station receives the cell identity information sent by the first base station, and can recognize the cell to which the terminal currently belongs. The identity information sent by the first base station to the second base station may also include an identity of an RNA in which the first base station is currently located. The second base station receives the identity of the RNA in which the first base station is currently located, and can recognize the RNA to which the first base station belongs.

S503. The second base station receives the identity information sent by the first base station, and determines whether an anchor base station needs to be updated for the terminal in the inactive state.

The second base station can determine, by using the foregoing message and a stored RNA message of the terminal, whether the terminal performs a periodic RNA update or performs an RNA update because the terminal moves out of a coverage area of an RNA, and then can determine whether the anchor base station needs to be updated for the terminal in the inactive state.

If the second base station determines that the first base station does not need to be set as a new anchor base station, in other words, the anchor base station is not updated in a current RNA update process. For example, when the second base station determines, based on the information in step S502, that the terminal performs a periodic RNA update, the second base station determines that an RNA update does not need to be performed.

S504. The second base station sends third indication information to the first base station, where the third indication information is used to indicate whether the anchor base station needs to be updated.

If the second base station determines that the anchor base station does not need to be updated, the second base station sends the third indication information to the first base station, to indicate that the anchor base station is not to be updated.

S505. The first base station receives the third indication information sent by the second base station, and sends, to the terminal in the inactive state, indication information that is used to indicate whether the anchor base station needs to be updated.

In this manner, it is ensured that the anchor base station of the terminal in the inactive state is not updated, thereby avoiding an unnecessary new RNA allocation process and reducing signaling overheads.

Figure 8:
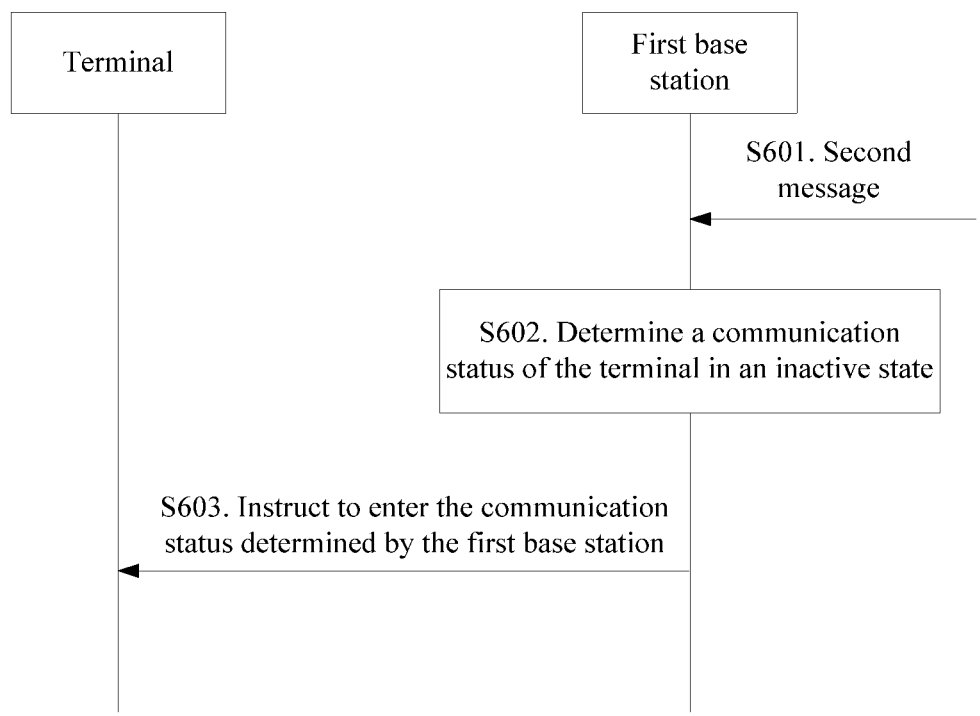
FIG. 8 is a flowchart of implementation of determining a communication status of a terminal in an inactive state according to an embodiment of this application.

FIG. 8 is a flowchart of implementation of determining, by a first base station, a communication status of a terminal in an inactive state according to an embodiment of this application. As shown in FIG. 8, the following steps are included.

S601. The first base station receives a second message, where the second message is used by the first base station to determine the communication status of the terminal in the inactive state.

The communication status of the terminal includes an inactive state, a connected state, or an idle state.

S602. The first base station determines the communication status of the terminal in the inactive state based on the second message.

S603. The first base station sends, to the terminal in the inactive state, indication information used to instruct the terminal in the inactive state to enter the communication status determined by the first base station.

In the communication method provided in this embodiment of this application, the first base station may receive the second message that is used to instruct the first base station to determine the communication status of the terminal in the inactive state, and then the first base station determines, based on the second message, that the communication status of the terminal in the inactive state is the inactive state, the connected state, or the idle state. Because the first base station determines the communication status of the terminal in the inactive state, the communication status of the terminal can be accurately determined. In addition, the terminal may be controlled to change the communication status after it is determined that the terminal needs to change the communication status, and the communication status may not be changed when the terminal does not need to change the communication status. This can reduce signaling overheads and energy consumption of the terminal.

The following describes, by using examples, specific implementation processes in which the first base station determines the communication status of the terminal in the inactive state in the embodiments of this application.

In a possible implementation, in this embodiment of this application, the second message that is used to instruct the first base station to determine the communication status of the terminal in the inactive state may include an active flag, where the active flag is used to indicate whether the terminal in the inactive state needs to enter the connected state.

The active flag may be represented by using a bit. For example, the active flag is represented by using 1 bit. If the bit that represents the active flag is set to 1, it indicates that the terminal in the inactive state needs to enter the connected state. If the bit that represents the active flag is set to 0, it indicates that the terminal in the inactive state does not need to enter the connected state.

That the terminal needs to enter the connected state may mean that the terminal needs to resume some or all bearers and/or sessions. The some or all bearers and/or sessions may be resumed in an RNA update process, or may be resumed after an RNA update. For example, if the terminal needs to send data during an RNA update, the active flag may be set to 1, to indicate, to the first base station, that the terminal in the inactive state expects to resume some or all bearers and/or sessions in an RNA update process.

Figure 9:
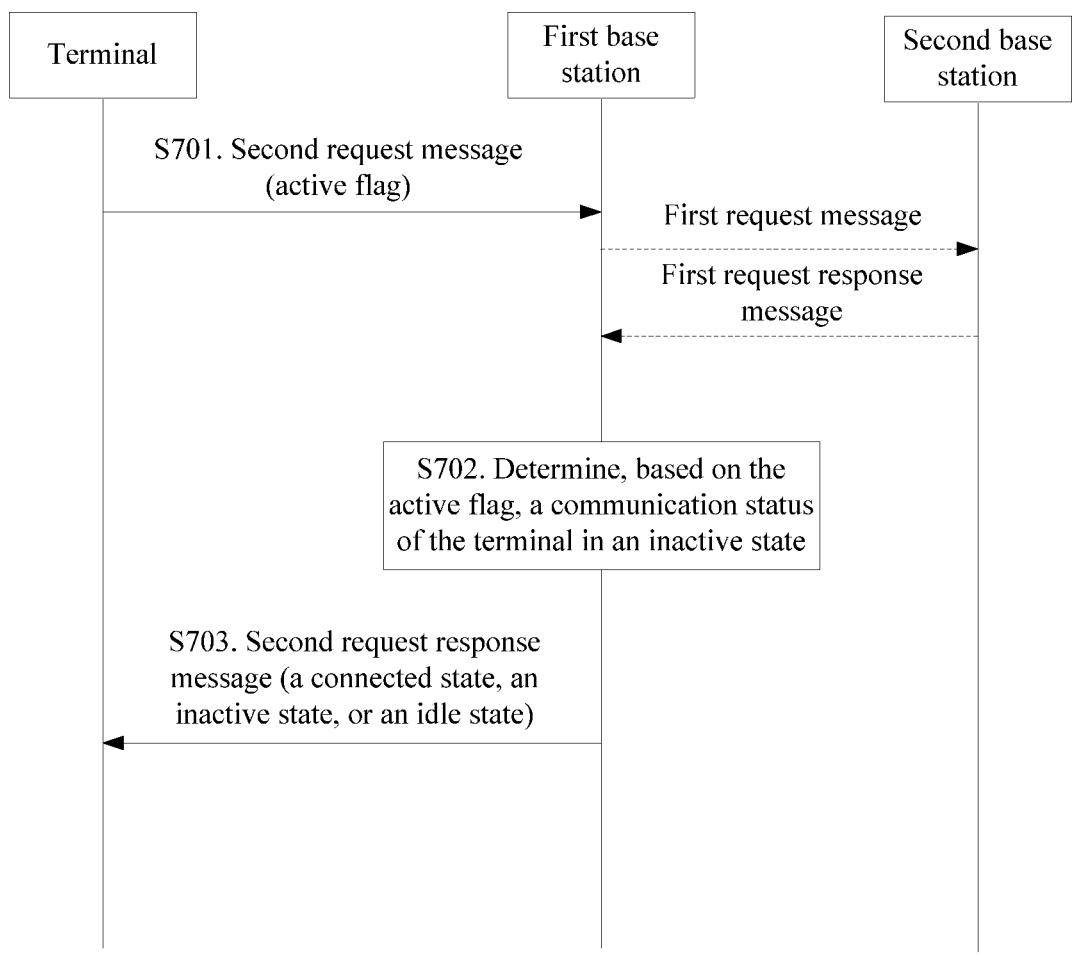
FIG. 9 is a flowchart of implementation of determining a communication status of a terminal in an inactive state according to an embodiment of this application.

FIG. 9 is a flowchart of implementation of determining, by a first base station, a communication status of a terminal in an inactive state based on an active flag according to an embodiment of this application. As shown in FIG. 9, the following steps are included.

S701. The terminal in the inactive state sends the active flag to the first base station.

The active flag may be sent to the first base station by the terminal in the inactive state by using a second request message, for example, by using an RRC connection resume request message. The RRC connection resume request message may include the active flag, and may further include the foregoing resume ID. The first base station may obtain the active flag by using the second request message sent by the terminal in the inactive state.

S702. After receiving the active flag, the first base station may determine the communication status of the terminal in the inactive state based on the active flag.

The first base station may determine the communication status of the terminal in the inactive state based on only the active flag, or may determine the communication status of the terminal in the inactive state with reference to the active flag and other information (for example, whether the first base station has enough idle resources to be allocated to the terminal for communication).

In a possible example, if the active flag indicates that the terminal in the inactive state needs to enter a connected state, the first base station determines that the communication status of the terminal in the inactive state is the connected state. For example, if a second message received by the first base station carries the active flag, and a bit of the active flag is set to 1, the first base station may determine that the active flag indicates that the terminal expects to resume some or all bearers and/or sessions. Therefore, the first base station may determine that the communication status of the terminal in the inactive state is the connected state, and perform S703.

S703. Send, to the terminal in the inactive state, indication information that is used to instruct the terminal to enter the connected state. The indication information that is used to instruct the terminal to enter the connected state may be sent by using a second request response message, for example, an RRC connection resume message sent by the first base station to the terminal in the inactive state (RNA information may be selectively updated).

After entering the connected state according to the indication information, the terminal in the inactive state may send a connection resume completed message to the first base station.

In another possible example, if the active flag indicates that the terminal in the inactive state does not need to enter a connected state, the new serving base station determines that the communication status of the terminal in the inactive state is the inactive state. For example, if a second message received by the first base station carries the active flag, and a bit of the active flag is set to 0, the first base station may determine that the active flag indicates that the terminal does not need to transmit data, and that a bearer and/or a session does not need to be activated. Therefore, the first base station may determine that the communication status of the terminal in the inactive state is still the inactive state, and perform S703.

S703. Send, to the terminal in the inactive state, indication information that is used to instruct the terminal to maintain the inactive state.

The first base station may send, by using a second request response message, the indication information that is used to instruct the terminal to maintain the inactive state. For example, the first base station instructs, in the following manner, the terminal to maintain the inactive state: The first base station sends an RRC connection resume message to the terminal in the inactive state, where the RRC connection resume message includes the indication information that is used to instruct the terminal in the inactive state to maintain the inactive state; or the first base station sends an RRC connection release message to the terminal in the inactive state, where the RRC connection release message includes the indication information that is used to instruct the terminal in the inactive state to maintain the inactive state; or the first base station sends an RRC connection suspend message to the terminal in the inactive state.

In still another possible example, if the first base station determines that no idle resource is to be allocated to the terminal, regardless of whether a bit of the active flag is set to 0 or 1, the first base station may determine that the communication status of the terminal in the inactive state is an idle state, and perform S703.

S703. The first base station sends, to the terminal in the inactive state, indication information that is used to instruct the terminal to enter the idle state. The indication information that is used to instruct the terminal to enter the idle state may be sent by using a second request response message. For example, the first base station sends an RRC connection release message to the terminal in the inactive state.

In a possible implementation, in FIG. 9, the first base station may send a first request message to a second base station, and the second base station feeds back a first request response message to the first base station. The first request message may include the resume ID, and the first request response message may include RNA information, so that processes in which the first base station determines the communication status of the terminal in the inactive state and determines whether to allocate a new RNA to the terminal in the inactive state can be completed in one communication process. The first request message may be a context request message, and the first request response message may be a context response message, so that the first base station obtains context information of the terminal in the inactive state.

When the first base station determines that the communication status of the terminal in the inactive state is the connected state and that the terminal performs an RNA update based on a first message sent by the second base station, in other words, when the second base station is an original anchor base station of the terminal in the inactive state, if the first base station and the second base station are base stations of different RATs, the first base station sends full configuration information to the terminal in the inactive state. The full configuration information may be sent by using a second request response message. For example, the full configuration information is sent by using an RRC connection resume message.

In another embodiment of this application, the second message that is used to instruct the first base station to determine the communication status of the terminal in the inactive state includes a terminal context information retrieval failure message.

Figure 10:
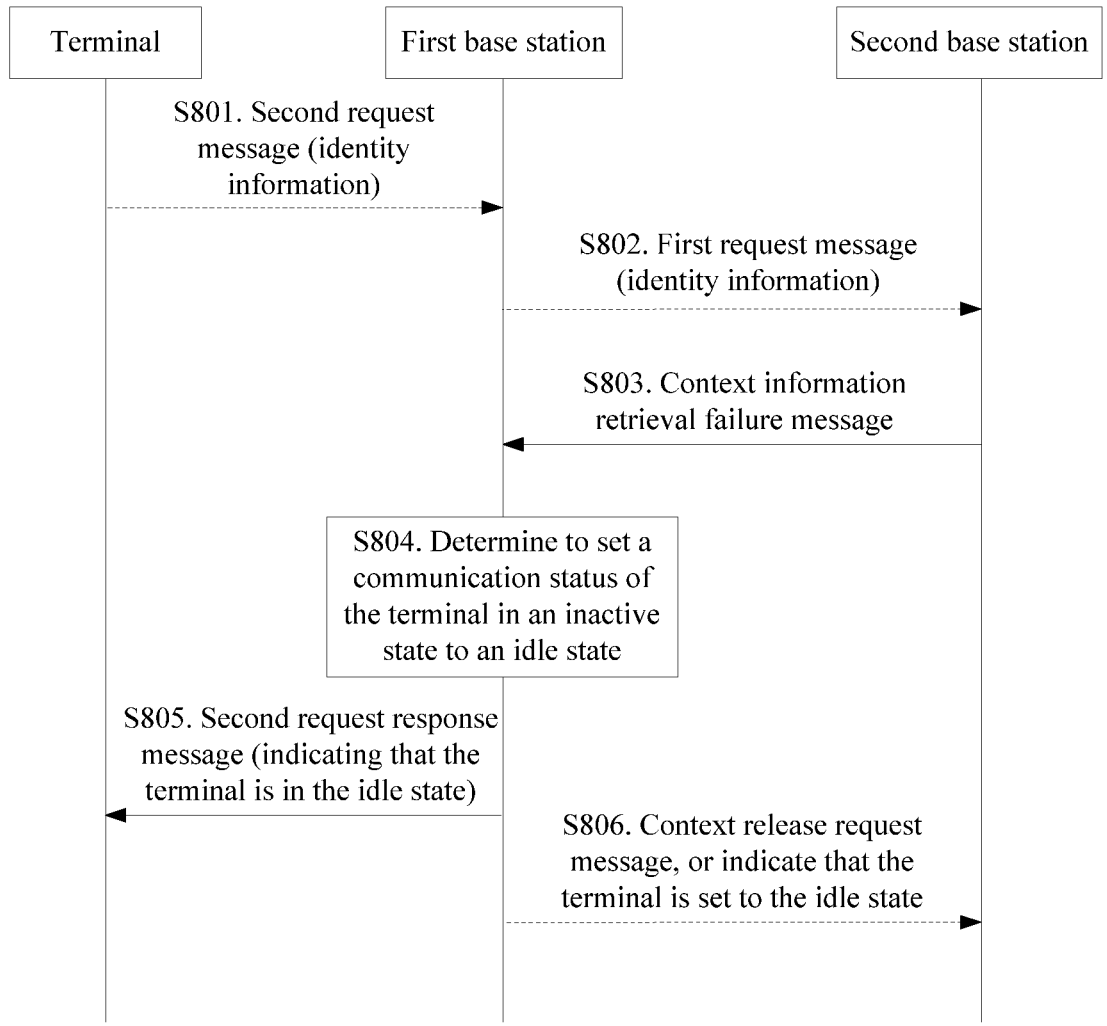
FIG. 10 is another flowchart of implementation of determining a communication status of a terminal in an inactive state according to an embodiment of this application.

FIG. 10 is another flowchart of implementation of determining, by a first base station, a communication status of a terminal in an inactive state according to an embodiment of this application. As shown in FIG. 10, the following steps are included.

S801. The terminal in the inactive state sends a second request message to the first base station.

The second request message may include resume ID information of the terminal, and may further include RNA update reason indication information. The second request message may be an RRC connection resume request message.

S801 is an optional step.

S802. The first base station sends a first request message to a second base station, where the first request message may include the resume ID information. For example, the first base station sends context information including a resume ID.

S802 is an optional step.

The second base station obtains context information of the terminal in the inactive state based on the resume ID included in the first request message. If the second base station fails to obtain the context information of the terminal in the inactive state, the second base station sends a context information retrieval failure message to the first base station.

S803. The first base station receives the context information retrieval failure message sent by the second base station.

S804. The first base station determines to set the communication status of the terminal in the inactive state to an idle state.

S805. The first base station sends, to the terminal in the inactive state, indication information that is used to indicate that the communication status of the terminal in the inactive state is the idle state. The indication information that is used to indicate that the communication status of the terminal in the inactive state is the idle state may be sent by using a second request response message.

For example, the first base station may send an RRC connection release message to the terminal in the inactive state.

S806. The first base station sends a context release request message or first indication information to the second base station, where the first indication information is used to indicate that the first base station sets the communication status of the terminal in the inactive state to the idle state, so that the second base station can release the context information related to the terminal whose context information fails to be obtained by the second base station or release a connection between a core network and the base station that is related to the terminal whose context information fails to be obtained by the second base station.

S806 is an optional step.

In still another embodiment of this application, the second message that is used to instruct the first base station to determine the communication status of the terminal in the inactive state may be network slice information and protocol data unit (PDU) session information that are sent by the second base station.

Figure 11:
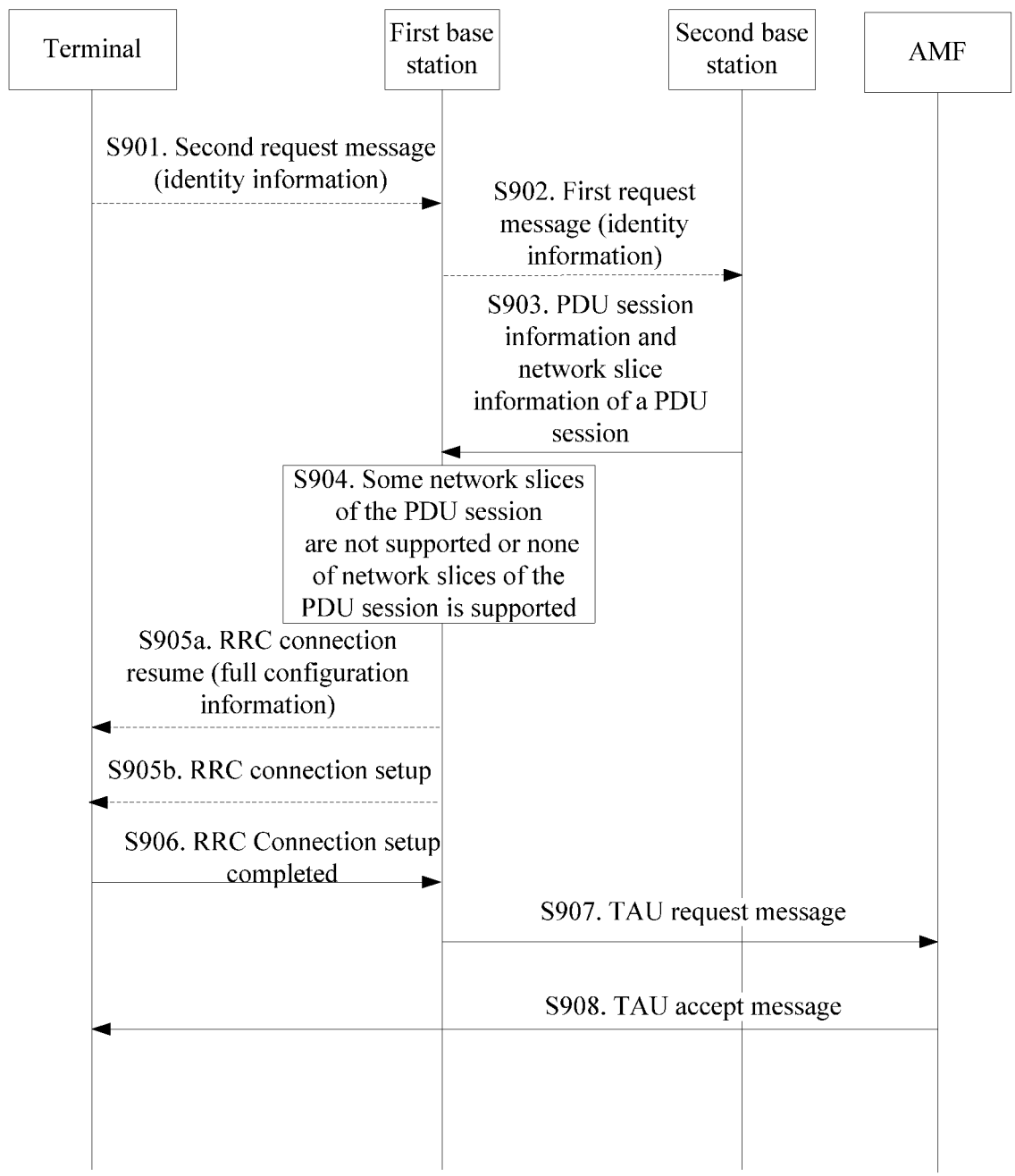
FIG. 11 is still another flowchart of implementation of determining a communication status of a terminal in an inactive state according to an embodiment of this application.

FIG. 11 is still another flowchart of implementation of determining, by a first base station, a communication status of a terminal in an inactive state according to an embodiment of this application. As shown in FIG. 11, the following steps are included.

In FIG. 11, steps of S901 and S902 are the same as implementation steps of S801 and S802, and details are not described herein again. The following only describes differences.

S903. The second base station sends PDU session information and network slice information of a PDU session to the first base station. The network slice information and the PDU session information may be sent by using a first request response message such as a context response message.

S904. The first base station determines, based on the PDU session information and the network slice information of the PDU session that are received, whether a network slice of the PDU session is supported. When determining that some network slices of the PDU session are not supported or none of network slices of the PDU session is supported, the first base station performs S905a or S905b.

S905a. The first base station sends an RRC connection resume message to the terminal in the inactive state, where the RRC connection resume message carries full configuration information.

Alternatively, S905b may be performed.

S905b. The first base station sends an RRC connection setup message to the terminal in the inactive state.

Only one of S905a and S905b needs to be performed.

S906. The terminal in the inactive state sends an RRC connection setup completed message to the first base station, where the RRC connection setup completed message carries a TAU request.

S907. The first base station sends the TAU request message to an AMF.

S908. The AMF sends a TAU accept message to the terminal.

In this embodiment of this application, the network slice information may be represented by using at least one of the following parameters:

1. Network slice identity (Network Slice ID, Slice ID)

1.1. Network slice type information. For example, the network slice type information may be used to indicate a network slice type such as enhanced mobile broadband (eMBB), ultra-reliable and low latency communications (URLLC), and massive machine type communication (mMTC). Optionally, the network slice type information may be further used to indicate an end-to-end network slice type, including a RAN-to-CN network slice type, or may be further used to indicate a RAN side network slice type or a CN side network slice type.

1.2. Service type information. The service type information is related to a specific service. For example, the service type information may be used to indicate service characteristics of or information about a specific service such as a video service, an internet of vehicles service, or a voice service.

1.3. Tenant information. The tenant information is used to indicate information about a client that creates or rents a network slice, for example, Tencent or State Grid Corporation of China.

1.4. User group information. The user group information is used to indicate information about a group of users who are grouped based on a characteristic such as a user level.

1.5. Slice group information. The slice group information is used to indicate information about a group of network slices that are grouped based on a characteristic. For example, all network slices that can be accessed by a terminal device are used as one slice group, or network slices may be grouped according to another criterion.

1.6. Network slice instance information. The network slice instance information is used to indicate an identity and characteristic information of an instance created for a network slice. For example, an identity may be allocated to a network slice instance, to indicate the network slice instance, or a new identity may be mapped based on the identity of the network slice instance, so that the new identity is associated with the network slice instance, and a receiver can recognize, based on the identity, the specific network slice instance indicated by the identity.

1.7. Dedicated core network (DCN) identity. The identity is used to uniquely indicate a dedicated core network in an LTE system or an eLTE system, such as an internet of things dedicated core network. Optionally, a mapping may be established between the DCN identity and the network slice identity, so that the network slice identity can be obtained based on the DCN identity through mapping, and the DCN identity may be obtained based on the network slice identity through mapping.

2. Single network slice selection assistance information (S-NSSAI). The S-NSSAI includes at least slice/service type (SST) information, and optionally, may further include slice differentiator (SD) information. The SST information is used to indicate a behavior of a network slice, such as a characteristic and a service type of the network slice. The SD information is complementary information of the SST information. If the SST information is for a plurality of network slices, the SD information may be corresponding to a unique network slice instance.

3. S-NSSAI group information. The S-NSSAI group information is used to indicate an S-NSSAI group into which network slices are grouped based on a characteristic.

For example, all network slices of a common AMF that can be accessed by a terminal device may be used as one S-NSSAI group.

4. Temporary identity (Temporary ID). The temporary identity is allocated by an AMF to a terminal that has registered with a CN side, and the Temporary ID may uniquely point to a specific AMF.

It should be understood that in this embodiment of this application, network slice indication information of a network slice may be represented by using at least one of the foregoing parameters. For example, the network slice indication information of the network slice may be represented by using a network slice type, or may be represented by using a network slice type and a service type, or may be represented by using a service type and tenant information. This is not limited in this embodiment of this application. How to represent the network slice indication information of the network slice is not described below again.

Optionally, a specific coding form of the network slice indication information is not limited. Different fields that can be carried in an interface message between different devices may represent different network slice indication information. Alternatively, abstracted index values can be used for replacement, and different index values are corresponding to different network slices.

In this embodiment of this application, to reduce information element overheads, the PDU session information and the network slice information of the PDU session may be carried in the first request response message sent by the second base station to the first base station.

Figure 12:
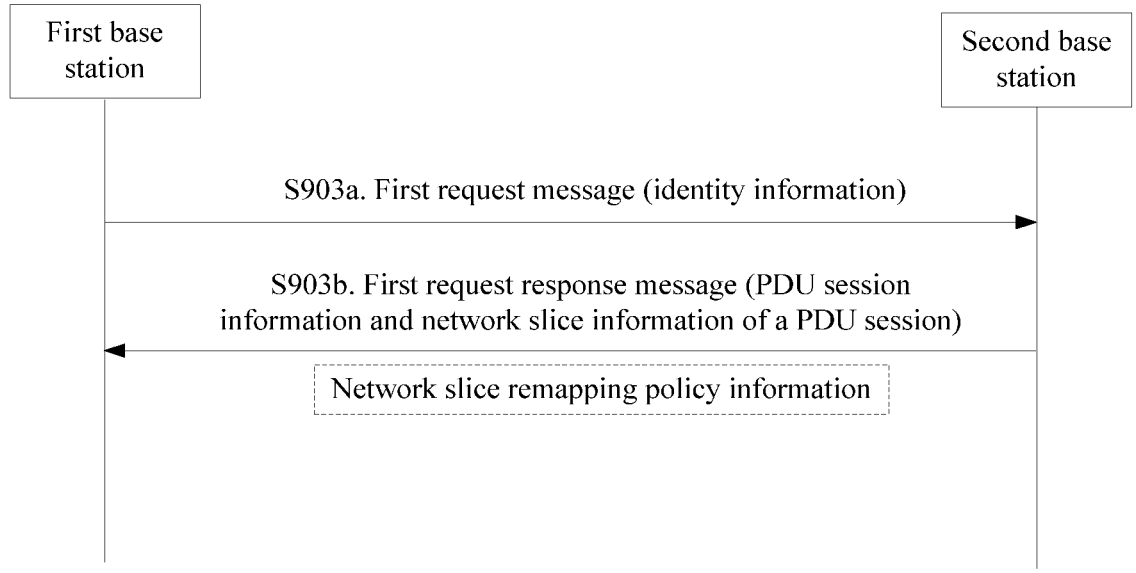
FIG. 12 is a flowchart of implementation of obtaining PDU session information and network slice information according to an embodiment of this application.

FIG. 12 is a flowchart of implementation of obtaining, by a first base station, PDU session information and network slice information of a PDU session by using a first request response message according to an embodiment of this application. As shown in FIG. 12, the following steps are included.

S903a. The first base station sends a first request message to a second base station.

In this embodiment of this application, the first request message sent by the first base station to the second base station may include a resume ID allocated by a network side to a terminal in an inactive state. After receiving the first request message including the resume ID, the second base station may determine context information, PDU session information, and network slice information of a PDU session that are retained by the terminal in the inactive state.

S903b. The second base station receives the first request message sent by the first base station, and sends a first request response message to the first base station, where the first request response message carries the PDU session information and the network slice information of the PDU session.

In a possible embodiment, the second message may further include network slice remapping policy information sent by the second base station to the first base station.

The second base station sends the network slice remapping policy information to the first base station, where the network slice remapping policy information is used to indicate at least one flow, session, or radio bearer for the terminal in the inactive state in a coverage area of the second base station; or may be used to indicate at least one new network slice to which a flow, a session, or a radio bearer supported by the terminal in the inactive state is remapped from at least one original network slice. The network slice remapping policy information may be a set of network slice indication information. For example, if a current flow, session, or radio bearer is originally mapped to a first network slice, the network slice remapping policy information indicates that the current flow, session, or radio bearer may be remapped to a second network slice, or remapped to a second network slice and a third network slice, or the like.

The network slice remapping policy information may be sent by using the first request response message sent by the second base station to the first base station. For example, in the method shown in FIG. 12, the first request response message may further include the network slice remapping policy information.

After the first base station receives the network slice remapping policy information, the PDU session information, and the network slice information corresponding to the PDU session that are sent by the second base station, if the first base station determines, based on the network slice information and the protocol data unit PDU session information, that some network slices of the PDU session are not supported or none of network slices of the PDU session is supported, and determines, based on the network slice remapping policy, that the unsupported network slices of the PDU session cannot be remapped to other network slices, the first base station sends a radio resource control connection setup message, a radio resource control connection resume message carrying full configuration information, or a radio resource control connection release message to the terminal in an inactive state.

In this embodiment of this application, in the foregoing manner, the first base station may complete a TAU process when determining that some network slices of the PDU session are not supported or none of network slices of the PDU session is supported.

It should be noted that, in the specification, claims, and accompanying drawings of the embodiments of the present application, the terms "first", "second", and the like are intended to distinguish between similar objects, but are not necessarily used to indicate a specific order. For example, the first indication information and the second indication information in the embodiments of the present invention are merely for convenience of description and distinguishing between different indication information, and do not constitute a limitation to indication information. It should be understood that the data termed in such a way is interchangeable in proper circumstances, so that the embodiments of this application described herein can be implemented in other orders than the order illustrated or described herein.

The foregoing describes the solutions provided in the embodiments of this application mainly from a perspective of interaction between the terminal in the inactive state, the first base station, and the second base station. It can be understood that, to implement the foregoing functions, the terminal in the inactive state, the first base station, and the second base station include a corresponding hardware structure and/or software module for performing each of the functions. In combination with the examples of units (devices, or components) and algorithm steps described in the embodiments disclosed in this application, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, the terminal in the inactive state, the first base station, and the second base station may be divided into functional units (devices, or components) based on the foregoing method examples. For example, functional units (devices, or components) may be obtained through division based on functions, or two or more functions may be integrated into one processing unit (device, or component). The integrated unit (device, or component) may be implemented in a form of hardware, or may be implemented in a form of a software functional unit (device, or component). It should be noted that the unit (device, or component) division in the embodiments of this application is an example, and is merely logical function division. There may be another division manner in actual implementation.

Figure 13:
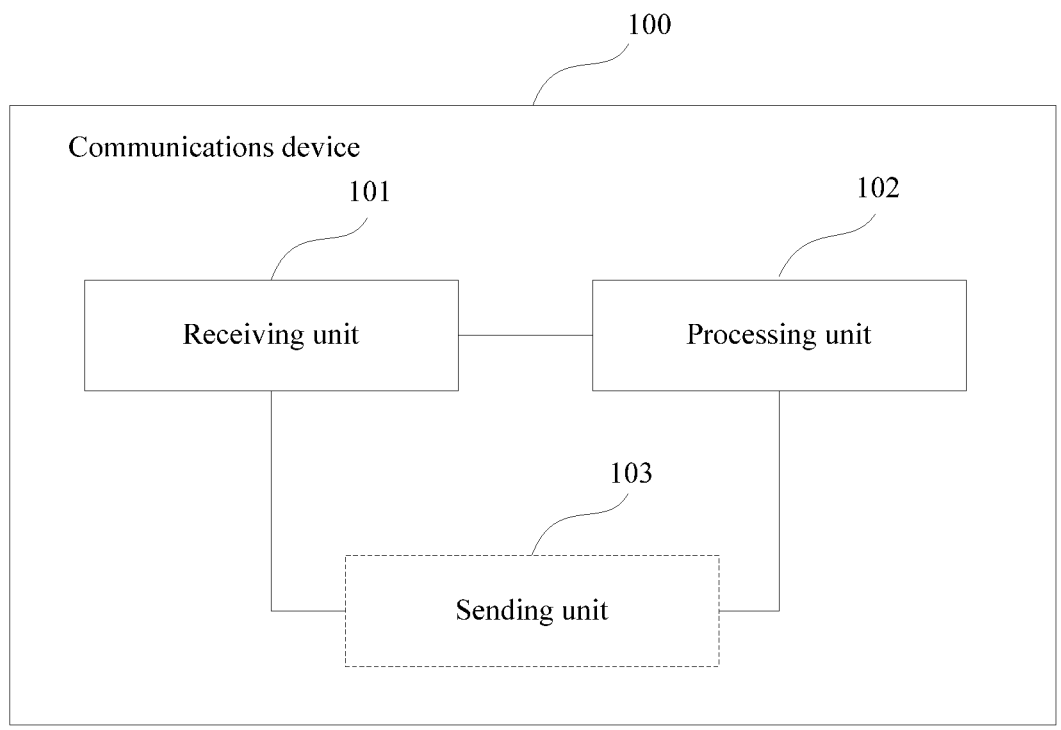
FIG. 13 is a schematic structural diagram of a communications device according to an embodiment of this application.

When integrated units (devices, or components) are used, FIG. 13 is a schematic structural diagram of a communications device 100 according to an embodiment of this application. The communications device 100 may be applied to a first base station. As shown in FIG. 13, the communications device 100 includes a receiving unit 101 and a processing unit 102. The receiving unit 101 is configured to receive a first message and/or receive a second message. The processing unit 102 is configured to determine, based on the first message received by the receiving unit 101, whether to allocate a new RNA to a terminal in an inactive state, and/or determine a communication status of the terminal in the inactive state based on the second message received by the receiving unit.

In a possible implementation, the first message may include RNA information sent by a second base station to the first base station, where the RNA information is used to indicate an RNA in which the terminal in the inactive state is currently located.

In another possible implementation, the first message includes RNA update reason indication information sent by the terminal in the inactive state to the first base station, where the RNA update reason indication information is used to indicate that an RNA update reason is a periodic update or an aperiodic update.

In still another possible implementation, the second message includes an active flag sent by the terminal in the inactive state to the first base station, where the active flag is used to indicate whether the terminal in the inactive state needs to enter a connected state.

The communications device 100 further includes a sending unit 103. The sending unit 103 is configured to: if the processing unit 102 determines that the communication status of the terminal in the inactive state is the connected state, and the first base station and a second base station are of different radio access technologies, send full configuration information to the terminal in the inactive state, where the second base station is an original anchor base station of the terminal in the inactive state.

In yet another possible implementation, the second message includes a context information retrieval failure message sent by a second base station to the first base station.

The communications device 100 further includes a sending unit 103. The sending unit 103 is configured to: after the receiving unit 101 receives the context information retrieval failure message, send a context release request message to the second base station; or send first indication information to the second base station, where the first indication information indicates that the first base station sets the communication status of the terminal in the inactive state to an idle state.

In still yet another possible implementation, the second message includes PDU session information and network slice information corresponding to a PDU session that are sent by a second base station to the first base station.

The processing unit 102 is further configured to: after the receiving unit 101 receives the PDU session information and the network slice information corresponding to the PDU session, determine, based on the PDU session information and the network slice information corresponding to the PDU session, whether a network slice of the PDU session is supported.

The communications device 100 further includes a sending unit 103. The sending unit 103 is configured to: if the processing unit 102 determines, based on the PDU session information and the network slice information corresponding to the PDU session, that some network slices of the PDU session are not supported or none of network slices of the PDU session is supported, send, to the terminal in an inactive state, a radio resource control connection setup message, a radio resource control connection release message, or a radio resource control connection resume message carrying full configuration information.

When a form of hardware is used for implementation, in this embodiment of this application, the receiving unit 101 may be a communications interface, a receiver, a receiver circuit, or the like. The processing unit 102 may be a processor or a controller. The sending unit 103 may be a communications interface, a transmitter, a transmitter circuit, or the like. The communications interface is a general term, and may include one or more interfaces.

Figure 14:
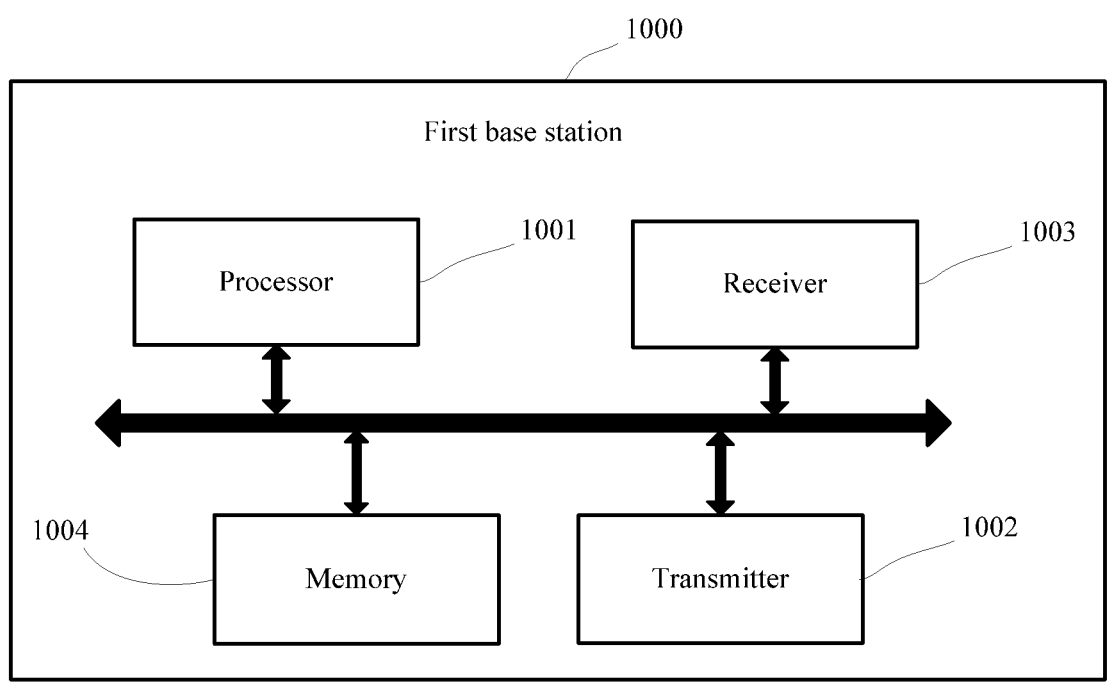
FIG. 14 is a schematic structural diagram of a first base station according to an embodiment of this application.

When the receiving unit 101 is a receiver, the processing unit 102 is a processor, and the sending unit 103 is a transmitter, the communications device 100 in this embodiment of this application may be a communications device shown in FIG. 14. The communications device shown in FIG. 14 may be a first base station.

FIG. 14 is a schematic structural diagram of a first base station 1000 according to an embodiment of this application. As shown in FIG. 14, the first base station 1000 includes a processor 1001, a transmitter 1002, and a receiver 1003. The processor 1001 may be alternatively a controller. The processor 1001 is configured to support the first base station in performing functions in FIG. 2 to FIG. 12. The transmitter 1002 and the receiver 1003 are configured to support the first base station in performing a message receiving and sending function. The first base station may further include a memory 1004. The memory 1004 is configured to be coupled to the processor 1001, and stores a necessary program instruction and necessary data of the first base station. The processor 1001, the transmitter 1002, the receiver 1003, and the memory 1004 are connected. The memory 1004 is configured to store an instruction. The processor 1001 is configured to execute the instruction stored in the memory 1004, to control the transmitter 1002 and the receiver 1003 to receive and send signals, and implement the steps that are in the foregoing methods and that are performed by the first base station for performing corresponding functions.

In the embodiments of this application, for concepts, explanations, detailed descriptions, and other steps that are related to the communications device 100 and the first base station 1000 and that are related to the technical solutions provided in the embodiments of this application, refer to descriptions about the content in the foregoing methods or other embodiments. Details are not described herein again.

Figure 15:
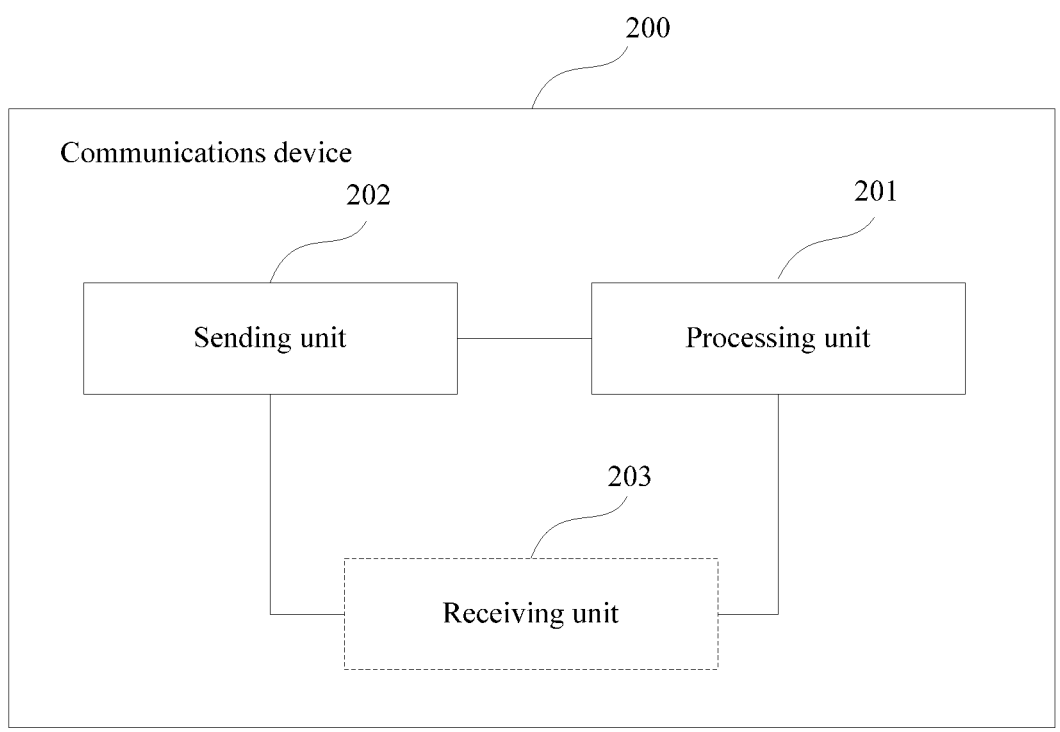
FIG. 15 is a schematic structural diagram of another communications device according to an embodiment of this application.

When integrated units (devices, or components) are used, FIG. 15 is a schematic structural diagram of another communications device according to an embodiment of this application. The communications device 200 shown in FIG. 15 may be applied to a second base station. As shown in FIG. 15, the communications device 200 may include a processing unit 201 and a sending unit 202.

In a possible implementation, the processing unit 201 is configured to determine RNA information, where the RNA information is used to indicate an RNA in which a terminal in an inactive state is currently located. The sending unit 202 is configured to send the RNA information determined by the processing unit 201 to a first base station.

In another possible implementation, the processing unit 201 is configured to determine that retrieval of context information of the terminal in the inactive state fails. The sending unit 202 is configured to: when the processing unit 201 determines that retrieval of the context information fails, send a context information retrieval failure message to the first base station.

The communications device 200 further includes a receiving unit 203. The receiving unit 203 is configured to: after the sending unit 202 sends the context information retrieval failure message, receive a context release request message sent by the first base station; or receive first indication information sent by the first base station, where the first indication information indicates that the first base station sets a communication status of the terminal in the inactive state to an idle state.

When a form of hardware is used for implementation, in this embodiment of this application, the processing unit 201 may be a processor or a controller. The sending unit 202 and the receiving unit 203 may be a communications interface, a transceiver, a transceiver circuit, or the like. The communications interface is a general term, and may include one or more interfaces.

Figure 16:
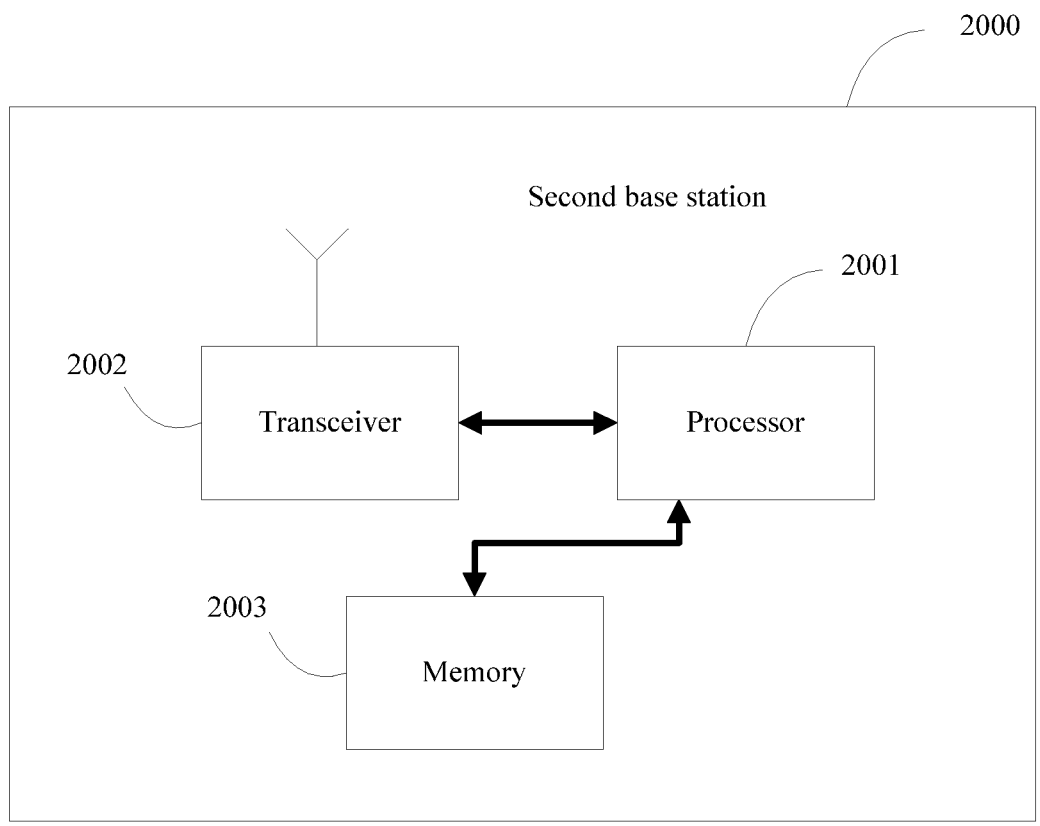
FIG. 16 is a schematic structural diagram of a second base station according to an embodiment of this application.

When the processing unit 201 is a processor, and the sending unit 202 and the receiving unit 203 are a transceiver, the communications device 200 in this embodiment of this application may be a communications device shown in FIG. 16. The communications device shown in FIG. 16 may be a second base station.

FIG. 16 is a schematic structural diagram of a second base station 2000 according to an embodiment of this application. As shown in FIG. 16, the second base station 2000 includes a processor 2001 and a transceiver 2002. The processor 2001 may be alternatively a controller. The processor 2001 is configured to support the second base station in performing functions in FIG. 2 to FIG. 12. The transceiver 2002 is configured to support the second base station in performing a message receiving and sending function. The second base station may further include a memory 2003. The memory 2003 is configured to be coupled to the processor 2001, and stores a necessary program instruction and necessary data of the second base station. The processor 2001, the transceiver 2002, and the memory 2003 are connected. The memory 2003 is configured to store an instruction. The processor 2001 is configured to execute the instruction stored in the memory 2003, to control the transceiver 2002 to receive and send signals, and implement the steps that are in the foregoing methods and that are performed by the second base station for performing corresponding functions.

In the embodiments of this application, for concepts, explanations, detailed descriptions, and other steps that are related to the communications device 200 and the second base station 2000 and that are related to the technical solutions provided in the embodiments of this application, refer to descriptions about the content in the foregoing methods or other embodiments. Details are not described herein again.

Figure 17:
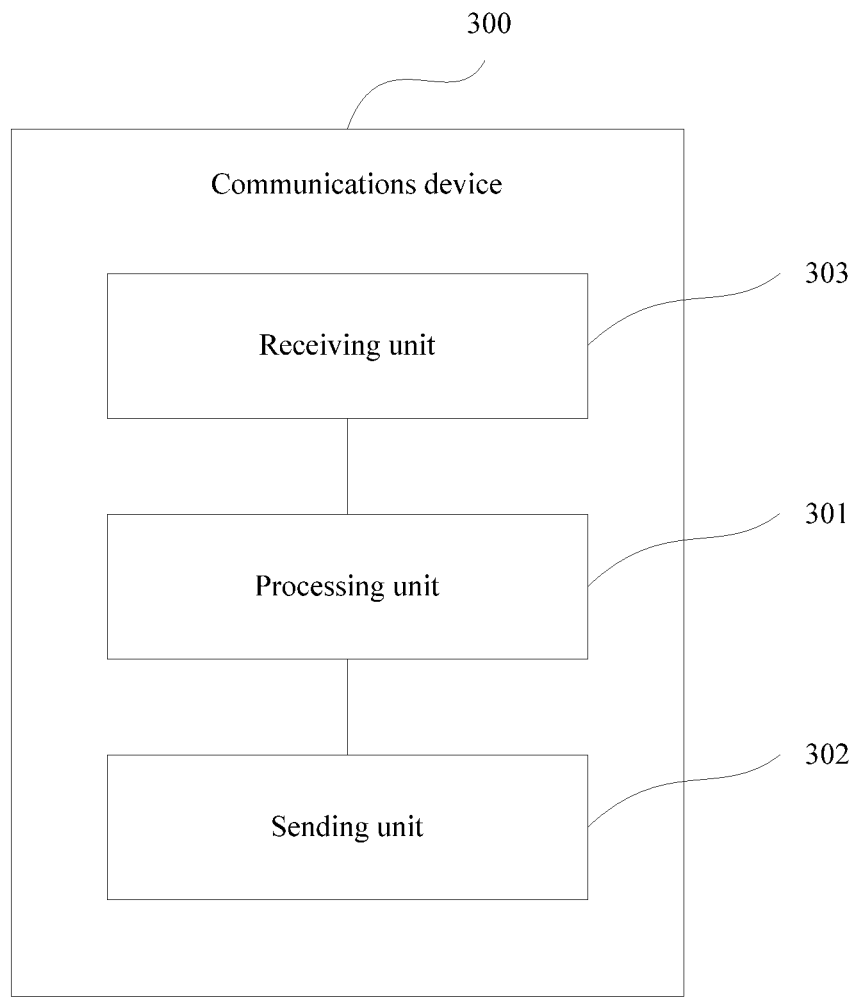
FIG. 17 is a schematic structural diagram of still another communications device according to an embodiment of this application.

When integrated units (devices or components) are used, FIG. 17 is a schematic structural diagram of another communications device according to an embodiment of this application. The communications device 300 shown in FIG. 17 may be applied to a terminal in an inactive state. As shown in FIG. 17, the communications device 300 may include a processing unit 301 and a sending unit 302.

In a possible implementation, the processing unit 301 is configured to determine RNA update reason indication information, where the RNA update reason indication information is used to indicate that an RNA update reason is a periodic update or an aperiodic update; and the sending unit 302 is configured to send the RNA update reason indication information determined by the processing unit 301 to a first base station.

In another possible implementation, the processing unit 301 is configured to determine an active flag, where the active flag is used to indicate whether the terminal in the inactive state needs to enter a connected state; and the sending unit 302 is configured to send the active flag determined by the processing unit 301 to a first base station.

The communications device 300 further includes a receiving unit 303. The receiving unit 303 is configured to: when a communication status of the terminal in the inactive state is the connected state, and the first base station and a second base station are of different radio access technologies, receive full configuration information sent by the first base station, where the second base station is an original anchor base station of the terminal in the inactive state.

When a form of hardware is used for implementation, in this embodiment of this application, the processing unit 301 may be a processor or a controller, the sending unit 302 may be a communications interface, a transmitter, a transmitter circuit, or the like, and the receiving unit 303 may be a communications interface, a receiver, a receiver circuit, or the like. The communications interface is a general term, and may include one or more interfaces.

Figure 18:
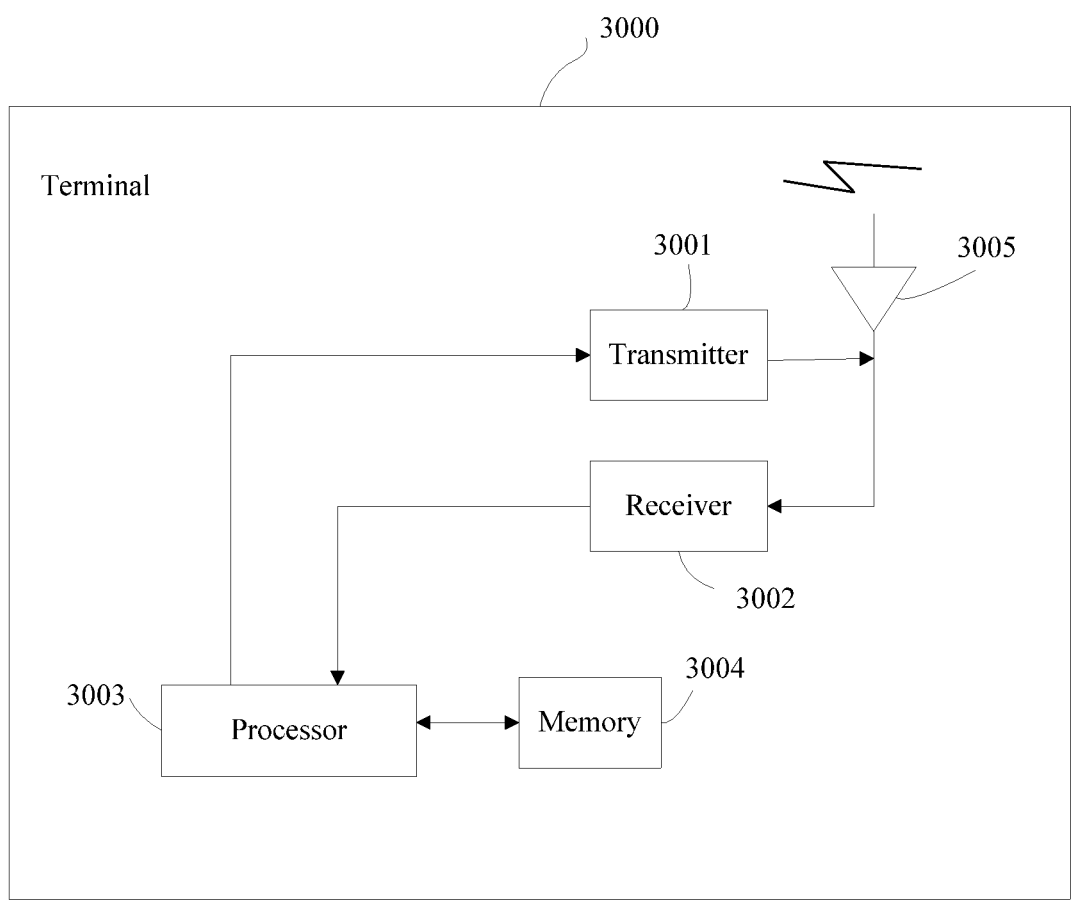
FIG. 18 is a schematic structural diagram of a terminal according to an embodiment of this application.

When the processing unit 301 of the communications device 300 is a processor, the receiving unit 303 is a receiver, and the sending unit 302 is a transmitter, the communications device 300 in this embodiment of this application may be a terminal 3000 shown in FIG. 18.

FIG. 18 shows the possible terminal 3000 according to an embodiment of this application. As shown in FIG. 18, the terminal 3000 includes a transmitter 3001, a receiver 3002, and a processor 3003. The processor 3003 is configured to support the terminal in performing functions in FIG. 2, FIG. 3, and FIG. 5 to FIG. 11. The transmitter 3001 and the receiver 3002 are configured to support a function of receiving and sending messages between the terminal and a first base station and/or a second base station. The terminal 3000 may further include a memory 3004. The memory 3004 is configured to be coupled to the processor 3003, and stores a necessary program instruction and necessary data of the terminal 3000. The processor 3003 executes the instruction stored in the memory 3004, performs functions of the terminal in the inactive state in the foregoing method embodiments, and controls the transmitter 3001 and the receiver 3002 to support a function of receiving and sending messages between the terminal and the first base station and/or the second base station.

The terminal 3000 may further include an antenna 3005.

In the embodiments of this application, for concepts, explanations, detailed descriptions, and other steps that are related to the communications device 300 and the terminal 3000 and that are related to the technical solutions provided in the embodiments of this application, refer to descriptions about the content in the foregoing methods or other embodiments. Details are not described herein again.

It can be understood that, the accompanying drawings of the embodiments of this application show only simplified designs of the first base station, the second base station, and the terminal. In actual application, the first base station, the second base station, and the terminal are not limited to the foregoing structures, for example, may further include an antenna array, a duplexer, and a baseband processing part.

The duplexer of the first base station and the duplexer of the second base station are configured to enable the antenna array to send and receive signals. The transmitter is configured to implement conversion between a radio frequency signal and a baseband signal. The transmitter may usually include a power amplifier, a digital-to-analog converter, and an inverter. The receiver may usually include a low-noise amplifier, an analog-to-digital converter, and an inverter. The receiver and the transmitter may be collectively referred to as a transceiver on some occasions. The baseband processing part is configured to implement processing of a sent or received signal, such as layer mapping, precoding, modulation/demodulation, or encoding/decoding, and perform separate processing on a physical control channel, a physical data channel, a physical broadcast channel, a reference signal, and the like. For another example, the terminal may further include a display device, an input/output interface, and the like.

The terminal may have a single antenna, or a plurality of antennas (that is, an antenna array). The duplexer of the terminal is configured to enable the antenna array to send and receive signals. The transmitter is configured to implement conversion between a radio frequency signal and a baseband signal. The transmitter may usually include a power amplifier, a digital-to-analog converter, and an inverter. The receiver may usually include a low-noise amplifier, an analog-to-digital converter, and an inverter. The baseband processing part is configured to implement processing of a sent or received signal, such as layer mapping, precoding, modulation/demodulation, or encoding/decoding, and perform separate processing on a physical control channel, a physical data channel, a physical broadcast channel, a reference signal, and the like. In an example, the terminal may also include a control part, configured to request an uplink physical resource, calculate channel state information (CSI) corresponding to a downlink channel, determine whether a downlink data packet is successfully received, and the like.

It should be noted that the foregoing processor in the embodiments of this application may be a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The memory may be integrated into the processor, or may be separate from the processor.

In an implementation, functions of the receiver and the transmitter may be considered to be implemented by using a transceiver circuit or a dedicated transceiver chip. The processor may be considered to be implemented by using a specialized processing chip, processing circuit, or processor, or a general-purpose chip.

In another implementation, program code that is used to implement functions of the processor, the receiver, and the transmitter is stored in the memory. A general-purpose processor implements the functions of the processor, the receiver, and the transmitter by executing the code in the memory.

Based on the methods provided in the embodiments of this application, an embodiment of this application further provides a communications system, including the first base station, the second base station, and one or more terminals.

An embodiment of this application further provides a computer storage medium, configured to store some instructions. When these instructions are being executed, any of the foregoing methods related to the terminal, the first base station, or the second base station can be implemented.

An embodiment of this application further provides a computer program product, configured to store a computer program. The computer program is used to perform the communication methods in the foregoing method embodiments.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

The invention claimed is:

1. A communication method comprising:
   receiving, by a first base station, from a terminal in an inactive state, a resume identity (ID) of the terminal in the inactive state;
   sending, by the first base station to a second base station, identity information, the identity information comprising the resume ID of the terminal in the inactive state and a physical cell identity (PCI) of a cell to which the terminal in the inactive state belongs; and
   determining, by the second base station based on the identity information, whether an anchor base station is to be updated for the terminal in the inactive state.

2. The communication method of claim 1, further comprising:
   receiving, by the first base station from the second base station, indication information, the indication information indicating whether the anchor base station is to be updated.

3. The communication method of claim 1, further comprising:
   receiving, by the first base station, a first message; and
   determining, by the first base station based on the first message, whether to allocate a new radio access network-based notification area (RNA) to the terminal in the inactive state.

4. The communication method of claim 1, further comprising:
   receiving, by the first base station, RAN based Notification Area (RNA) information from the second base station, the RNA information indicating an RNA in which the terminal in the inactive state is currently located.

5. The communication method of claim 1, wherein the determining, by the second base station, whether the anchor base station is to be updated for the terminal in the inactive state comprises:
   determining, by the second base station, whether the terminal performs a periodic RNA update or performs an RNA update because the terminal moves out of a coverage area of an RNA.

6. The communication method of claim 1, further comprising:
   sending, by the second base station to the first base station, indication information, the indication information indicating whether the anchor base station is to be updated.

7. A communication method comprising:
   receiving, by a first base station from a terminal in an inactive state, a resume identity (ID) of the terminal in the inactive state;
   sending, by the first base station to a second base station, identity information, the identity information comprising the resume ID of the terminal in the inactive state and a physical cell identity (PCI) of a cell to which the terminal in the inactive state belongs; and
   receiving, by the first base station from the second base station in response to sending the identity information, indication information indicating whether an anchor base station is to be updated for the terminal in the inactive state.

8. The communication method of claim 7, further comprising:
   sending, by the first base station to the terminal, the indication information indicating whether the anchor base station is to be updated for the terminal in the inactive state.

9. The communication method of claim 7, further comprising:
   receiving, by the first base station, a first message; and
   determining, by the first base station based on the first message, whether to allocate a new radio access network-based notification area (RNA) to the terminal in the inactive state.

10. The communication method of claim 7, further comprising:
    receiving, by the first base station, RAN based Notification Area (RNA) information from the second base station, the RNA information indicating an RNA in which the terminal in the inactive state is currently located.

11. A communication apparatus comprising:
    a receiver configured to receive, from a terminal in an inactive state, a resume identity (ID) of the terminal in the inactive state; and
    a transmitter configured to send, to a second base station, identity information, the identity information comprising the resume ID of the terminal in the inactive state and a physical cell identity (PCI) of a cell to which the terminal in the inactive state belongs; and
    wherein the receiver is further configured to receive, from the second base station in response to sending the identity information, indication information indicating whether an anchor base station is to be updated for the terminal in the inactive state.

12. The communication apparatus of claim 11, wherein the transmitter is further configured to send, to the terminal, the indication information indicating whether the anchor base station is to be updated.

13. The communication apparatus of claim 11, wherein the receiver is further configured to receive a first message; and
    the communication apparatus further comprises a processor, and the processor is configured to determine, based on the first message, whether to allocate a new radio access network-based notification area (RNA) to the terminal in the inactive state.

14. The communication apparatus of claim 11, wherein the receiver is further configured to receive RAN based Notification Area (RNA) information from the second base station, the RNA information indicating an RNA in which the terminal in the inactive state is currently located.

15. A communication system comprising: a first base station and a second base station;
    wherein the first base station is configured to:
    receive, from a terminal in an inactive state, a resume identity (ID) of the terminal in the inactive state; and
    send, to the second base station, identity information, the identity information comprising the resume ID of the terminal in the inactive state and a physical cell identity (PCI) of a cell to which the terminal in the inactive state belongs; and wherein the second base station is configured to determine, based on the identity information, whether an anchor base station is to be updated for the terminal in the inactive state.

16. The communication system of claim 15, wherein the first base station is further configured to receive, from the second base station, indication information, the indication information indicating whether the anchor base station is to be updated.

17. The communication system of claim 15, wherein the first base station is further configured to:
receive a first message; and
determine, based on the first message, whether to allocate a new radio access network-based notification area (RNA) to the terminal in the inactive state.

18. The communication system of claim 15, wherein the first base station is further configured to receive RAN based Notification Area (RNA) information from the second base station, the RNA information indicating an RNA in which the terminal in the inactive state is currently located.

19. The communication system of claim 15, wherein determining whether the anchor base station is to be updated for the terminal in the inactive state comprises:
determining whether the terminal performs a periodic RNA update or performs an RNA update because the terminal moves out of a coverage area of an RNA.

20. The communication system of claim 15, wherein the second base station is further configured to send, to the first base station, indication information, the indication information indicating whether the anchor base station is to be updated.

* * * * *